United States Patent [19]
Morgan et al.

[11] Patent Number: 5,524,254
[45] Date of Patent: Jun. 4, 1996

[54] SCHEME FOR INTERLOCKING LINE CARD TO AN ADDRESS RECOGNITION ENGINE TO SUPPORT PLURALITY OF ROUTING AND BRIDGING PROTOCOLS BY USING NETWORK INFORMATION LOOK-UP DATABASE

[75] Inventors: Fearghal Morgan, Galway; Joseph O'Callaghan, Glounthaune, both of Ireland; Michael J. Seaman, San Jose, Calif.; John Rigby; Andrew Walton, both of Reading, England; Una M. Quinlan, Dublin, Ireland; Stewart F. Bryant, Redhill, England

[73] Assignee: Digital Equipment Corporation, Maynard, Mass.

[21] Appl. No.: 269,997

[22] Filed: Jul. 1, 1994

Related U.S. Application Data

[63] Continuation of Ser. No. 819,491, Jan. 10, 1992, abandoned.
[51] Int. Cl.$^6$ .................................................. G06F 13/00
[52] U.S. Cl. ................ 395/800; 395/200.2; 395/200.12; 395/282; 395/286; 370/85.1; 370/85.13; 364/222.2; 364/229.2; 364/240.8; 364/927.92; 364/931.4; 364/940; 364/940.2; 364/DIG. 2
[58] Field of Search ................................ 395/800, 200, 395/325, 200.2, 200.12, 282, 286; 370/85.13, 85.14, 85.1, 94.1; 364/DIG. 1, DIG. 2

[56] References Cited

U.S. PATENT DOCUMENTS

| 4,677,588 | 6/1987 | Benjamin et al. | 364/900 |
| 4,688,170 | 8/1987 | Waite et al. | 364/200 |

(List continued on next page.)

FOREIGN PATENT DOCUMENTS

| 91/16679 | 10/1991 | WIPO | H04L 29/06 |

OTHER PUBLICATIONS

T. B. Pei et al, "VLSI Implementation of Routing Tables: tries and Cams"; IEEE Conference on Computer Communications (INFOCOM), vol. 2, 7 Apr. 1991, Bal Harbour, FL, US pp. 512–524, XP223375.

P. V. Mockapetris, "Development of the Domain Name Server"; Computer Communication Review, vol. 18, No. 4, Aug. 1988, New York US, pp. 123–133.

(List continued on next page.)

*Primary Examiner*—Meng-Ai An
*Attorney, Agent, or Firm*—Kenyon & Kenyon

[57] ABSTRACT

The present invention provides an interlock scheme for use between a line card and an address recognition apparatus. The interlock scheme reduces the total number of read/write operations over a backplane bus coupling the line card to the address recognition apparatus required to complete a request/response transfer. Thus, the line card and address recognition apparatus are able to perform a large amount of request/response transfers with a high level of system efficiency. Generally, the interlocking scheme according to the present invention merges each ownership information storage location into the location of the request/response memory utilized to store the corresponding request/response pair to reduce data transfer traffic over the backplane bus. According to another feature of the interlock scheme of the present invention, each of the line card and the address recognition engine includes a table for storing information relating to a plurality of database specifiers. Each of the database specifiers contains control information for the traversal of a lookup database used by the address recognition apparatus. At the time the processor of a line card generates a request for the address recognition apparatus, it will analyze the protocol type information contained in the header of a data packet. The processor will utilize the protocol type information as a look-up index to its table of database specifiers for selection of one of the database specifiers. The processor will then insert an identification of the selected database specifier into the request with the network address extracted from the data packet.

23 Claims, 19 Drawing Sheets

U.S. PATENT DOCUMENTS

| | | | |
|---|---|---|---|
| 4,787,028 | 11/1988 | Fintrock et al. | 364/200 |
| 4,914,583 | 4/1990 | Weisshaar et al. | 395/650 |
| 4,933,937 | 6/1990 | Konishi | 370/85.13 |
| 4,933,938 | 6/1990 | Sheehy | 370/85.13 |
| 4,947,390 | 8/1990 | Sheehy | 370/85.13 |
| 4,955,020 | 9/1990 | Stone et al. | 370/85.9 |
| 5,027,350 | 6/1991 | Marshall | 370/85.13 |
| 5,086,426 | 2/1992 | Tsukakoshi et al. | 370/85.13 |
| 5,111,453 | 5/1992 | Morrow | 370/85.13 |
| 5,136,716 | 8/1992 | Harvey et al. | 395/800 |
| 5,138,615 | 8/1992 | Lamport et al. | 370/94.3 |
| 5,142,622 | 8/1992 | Owens | 395/200 |
| 5,142,674 | 8/1992 | Barker et al. | 395/600 |
| 5,166,931 | 11/1992 | Riddle | 370/94.1 |
| 5,226,120 | 6/1993 | Brown et al. | 395/200 |
| 5,301,303 | 4/1994 | Abraham et al. | 395/500 |

OTHER PUBLICATIONS

A. V. Aho, et al, "Data Structures and Algorithms"; Addison–Wesley, Reading, US, Chapter 5, Paragraph 5,3, Figure 5.9.

"Fragmentary String Matching by selective access to hybrid tries" by Dengel, A. et al, IEEE Computer Soc. press, Aug. 1992.

"Cascading Content–Addressable Memories", by Moors T. et al. IEEE Micro, pp. 56–66, vol. 12, Issue 3, Jun. 1992.

"Trie Hashing with Controlled Load", by Witold A. et al, IEEE transaction Software engineering vol. 17, No. 7; Jul. 1991.

"Term Indexing for retrieval by Unification", Haruo Yokota et al. IEEE Computer Soc. press, pp. 313–320, Feb. 1989.

REQ_WIP = REQUEST-WRITE-IN-PROGRESS
FBUS_AS = FUTUREBUS ADDRESS STROBE
LWO_RING = ADDRESS IN RRSRAM OF (RING AND RING ENTRY)
FBUS_RING = RING ENTRY BEING ACCESSED BY FUTUREBUS

FIG. 8
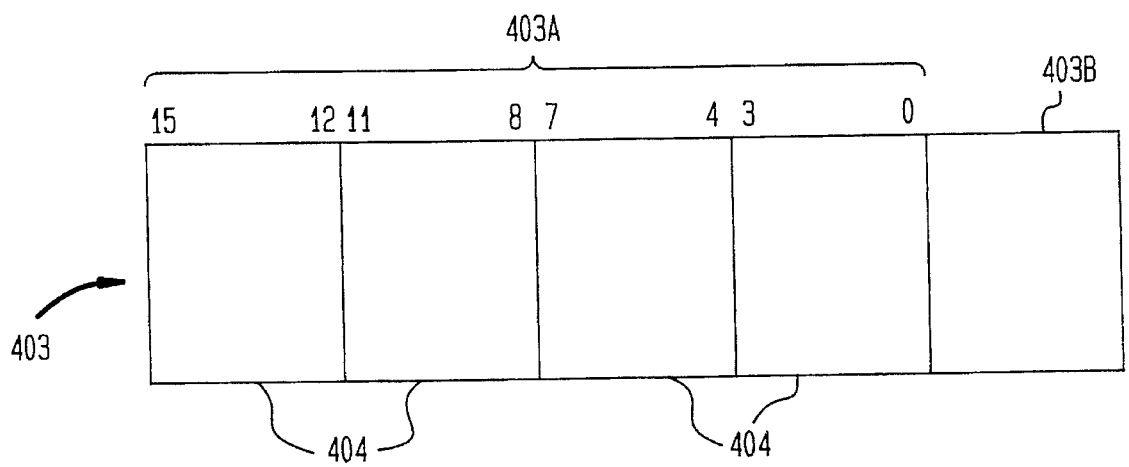
FIG. 8A
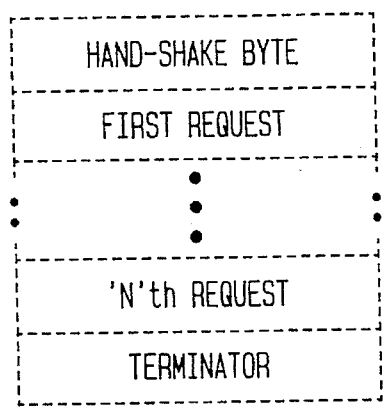
FIG. 8B
| REQUEST TYPE | TYPE <7:5> | TYPE <4:0> |
|---|---|---|
| PARSER | 0 0 X | DATABASE SPECIFIER |
| INTERROGATIVE | 0 1 X | DATABASE SPECIFIER |
| MAINTENANCE READ | 1 0 0 | X X X X X |
| MAINTENANCE WRITE | 1 0 1 | X X X X X |

FIG. 8D

| FIELD | ACTUAL SIZE | LONGWORDS IN LOOKUP_RESULT | RETURNED FOR | COMMENT |
|---|---|---|---|---|
| INT_STATUS | 24 BITS | 1 | TRA, TER | ALWAYS PRESENT. ADDITIONAL STATUS SPECIFIC TO EACH LOOKUP. |
| PAR_PTR_ADD | 20 BITS | 1 | TRA, TER | THE DRAM ADDRESS WHERE THE PARENT POINTER IS LOCATED. |
| PAR_PTR | 23 BITS | 1 | TRA, TER | THIS IS THE PARENT POINTER ASSOCIATED WITH THE NODE WHERE THE LOOKUP TERMINATED. |
| POINTER_ENTRIES | 16*23 BITS | 16 | TRA | 16 POINTER ENTRIES ASSOCIATED WITH THE NODE WHERE THE LOOKUP TERMINATED. |
| DSP_POINTER | 23 BITS | 1 | TRA | THE DSP POINTER ENTRY ASSOCIATED WITH THE TRA NODE WHERE THE LOOKUP TERMINATED. |
| MATCH_POINTER | 23 BITS | 1 | TER | THE MATCH POINTER ENTRY ASSOCIATED WITH THE TER NODE WHERE THE LOOKUP TERMINATED. |
| PREFIX_STRINGS | 4*23 BITS | 4 | TRA, TER | PREFIX STRING ENTRIES ASSOCIATED WITH THE NODE WHERE THE LOOKUP TERMINATED. |

FIG. 8F

TABLE 15: DMA CONTROL PARAMETERS

| FIELD | FUNCTION |
|---|---|
| DMA_COUNT | INDICATES NUMBER OF WORDS TO TRANSFER |
| DMA_STRT_ADDR | INDICATES THE FORWARDING DATABASE START ADDRESS FOR THE READ/WRITE TRANSACTION |

FIG. 8G

```
LONGWORD_0   : MAINTENANCE REQUEST LONGWORD 0
LONGWORD_1   : UNUSED
    . .
    . .
LONGWORD_7   : UNUSED

LONGWORD_8   : ID_STATUS BYTE + UNUSED BYTES
LONGWORD_9   : DMA_CONTROL (1)
    . .
    . .
LONGWORD_8+n : DMA_CONTROL (n),            /* n = DMA_NUMBER  */

LONGWORD_9+n : DMA_DATA_AREA (1),
    . .
    . .
             : DMA_DATA_AREA (n)
LONGWORD_X   :                             /* x = 9 + n + DMA_COUNT (1) +
                                            /*  .... + DMA_COUNT (n)
             ]
```

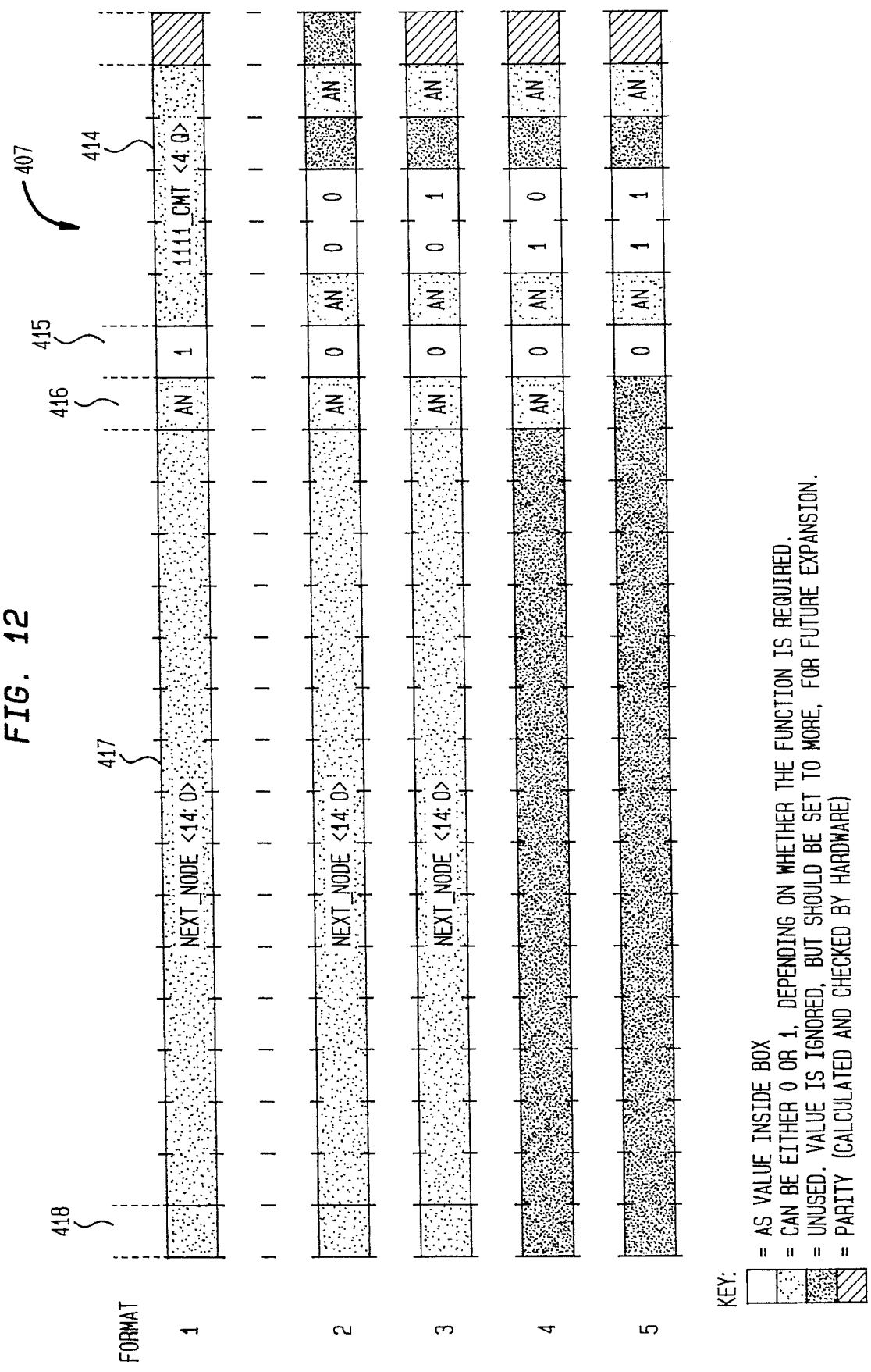

önlich
SCHEME FOR INTERLOCKING LINE CARD TO AN ADDRESS RECOGNITION ENGINE TO SUPPORT PLURALITY OF ROUTING AND BRIDGING PROTOCOLS BY USING NETWORK INFORMATION LOOK-UP DATABASE This is a continuation of application Ser. No. 07/819,491 filed Jan. 10, 1992, now abandoned.

FIELD OF THE INVENTION

The present invention is directed to computer networks and, more particularly, to a scheme for interlocking line cards to a shared address recognition apparatus utilized for the storage and look-up of network address information.

BACKGROUND OF THE INVENTION

The capability of computers to communicate with one another has become a basic attribute of modern information processing. There is an ongoing proliferation of user applications that depend upon the ability of a computer running one of the user applications to send and receive data to and from other computers. The communication capability is necessary for the user application to be able to complete the task for which the application was developed or to communicate information to other users within a group or organization. A particular application may be designed, for example, to call subroutines running on another computer for certain data processing functions or to access a remote database to obtain input data or to store results.

An important objective in providing a communication capability among computers is to make all of the database and processing resources of the group or organization available to each user in the group or organization. In response to the growing need for sophisticated communication capabilities among computers, network, routing and bridging protocols such as IP, DECnet, OSI, etc. have been developed to control data transmissions between computers linked to one another in a network. The various protocols are implemented in transmission services used to couple computers to one another.

Each protocol is typically defined in terms of a number of layers, with each layer relating to a certain aspect of the functionality required for data transmissions throughout a network. For example, the first three layers are defined as a physical layer, a data link layer and a network layer. The physical layer is directed to the physical and electrical specifications of a physical link, for example, a bus, that couples the computers of a network to one another. The physical layer controls bit transmissions through the link so that a series of bits of a data packet can be communicated from one computer on the network to another computer on the network. The physical layer will set the voltage levels for logical ones and zeros, the timing of stable bit information on a physical link and so on, as necessary to transmit the bits of a data packet over the physical link.

The data link layer is directed to the packaging or framing of bits received in a data transmission into a defined packet that is free of transmission errors. The data link layer creates and recognizes boundaries between bits to define bit fields. The bits between boundaries provide structure and meaning to the bits of a data packet. For example the data packet can include a header, comprising the first n bits of a transmission, for computer source and destination information, the length of the data packet in bytes, the network protocol being used and so on. The header can be followed by framed bytes of data comprising the actual message being communicated between two or more computers on the network.

The network layer is directed to the control of routing information required to direct a message from a source computer to a destination computer of the network. Each protocol will define the length and content for a network address to uniquely identify each source or destination of data packets and the processing scheme for routing a data packet through a network. The network address information is in one of the bit fields of a data packet, as framed by the data link layer processing scheme defined by the protocol.

Networks are generally arranged into local area networks (LANs) and wide area networks (WANs). A LAN couples computers that are physically located relatively close to one another, as for example in the same building. A WAN couples computers that may be located in different cities or indeed on different continents. A WAN usually includes components such as a router to receive a data packet from a computer on one LAN and to forward the data packet to a computer on another LAN.

The router processes a network address of a data packet according to a protocol implemented in the transmission service used on the network to determine how the data packet is to be routed, e.g., to another router directly coupled to the receiving LAN or to an intermediate router, etc. Each router stores information on the topology of the network for use in routing each data packet.

A bridge is another component that may be utilized to transfer data packets from computers of one LAN to computers of another LAN. A bridge intercouples different LANs and monitors communications within and between the LANs to "learn" source and destination address information. The bridge continuously learns and "ages" address information to accommodate the transfer of a data packet between the LANs.

Typically, each of the bridge and router components have access to a look-up database that contains bridging or routing information, respectively, relating to the network addresses of the sources and destinations of data in the particular network being serviced by the respective router or bridge. An address recognition engine can be implemented as a resource for a router or bridge for access to the look-up database.

The router or bridge operates to extract the network address from the header of a data transmission received at the router or bridge and inputs the address to the address recognition engine. The address recognition engine utilizes the input network address as an index for traversal of the look-up database to locate an entry corresponding to the network address. The entry contains protocol information required by the router or bridge for directing the data transmission to the designated destination.

As should be understood, the nature and content of the information that would be stored in a database entry depends upon whether a router or bridge were implemented in the network due to the differing operating characteristics of routing and bridging operations. Moreover, the size and format of the network address and the nature and content of the network information related to the network address in a particular network are defined by the network protocol implemented in the network. Accordingly, the structure of a look-up database must be designed to accommodate either bridging or routing as well as the address length and information content requirements of the protocol being utilized in the network were the bridge or router is operating.

Thus, a look-up database designed to support a router in a network implementing, e.g., a DECnet protocol would not be suitable for use by a bridge, and so on.

A problem concerning computer communications is encountered when a user application running on a computer in a first network utilizing a first data transmission service needs to communicate with a computer coupled to another network utilizing a different data transmission service. The physical layer implemented in the first network may be entirely different from the corresponding layer implemented in the other network. In an effort to fully utilize the processing and database resources of a computer system, more and more user applications running on, for example, computers of a network in one organization need to communicate with user applications or processing and database resources running on computers of a network in a second organization. Each network and its associated data transmission service and network protocol can be viewed as a domain of a larger overall network wherein all of the computers of the larger network need to communicate with one another.

A series of line cards can be provided to service various different data transmission services so as to provide a coupling between different domains of a computer network. Each line card is dedicated to a particular data transmission service and is designed to support the physical and data link layers implemented in the particular data transmission service. The line cards are coupled to one another, as, for example, by a backplane bus for transmission of data packets across different data transmission services.

As should be understood, each line card operates as a bridge or router and requires a look-up database designed to accommodate its needs. While implementing a look-up database on each line card provides a solution to the network address need, such an approach results in redundancy of data throughout the system as well as an inordinate use of line card real estate.

Thus, there is a need for a look-up database that is sufficiently flexible in design to function as a shared resource to a plurality of line cards and for an efficient interlock scheme to facilitate high bus traffic between the line cards and the shared look-up database resource.

SUMMARY OF THE INVENTION

The present invention provides an address recognition apparatus that is flexible in design and usable in routing and bridging operations in the context of various different network protocols. In this manner, a single address recognition apparatus according to the present invention can service a router, a bridge or both simultaneously, and, at the same time support look-up operations for several different protocols. The address recognition apparatus is also structured to accommodate a large amount of network information data in an economical and efficient look-up scheme so that the address recognition apparatus can service a plurality of routing and bridging components as a shared resource.

The present invention also provides a scheme for interlocking a series of line cards to the address recognition apparatus via a backplane bus. In this manner, the present invention achieves high speed network address information look-up services with backplane bus efficiency sufficiently high to support a backplane based system comprising a plurality of line cards and a shared address recognition resource.

Generally, the address recognition apparatus of the present invention comprises an address recognition engine coupled to a look-up database. The look-up database comprises a primary database and a secondary database. The address recognition engine accepts as an input the network address extracted from a data transmission. The address recognition engine uses the network address as an index to the primary database. The primary database comprises a multiway tree node structure (TRIE) arranged for traversal of the nodes as a function of preselected segments of the network address and in a fixed sequence of the segments to locate a pointer to an entry in the secondary database.

The TRIE structure has a predictable search time, does not require wide memory for comparisons of digit values to select a node pointer and can be implemented in an economical amount of memory space particularly in a sparsely populated address space, as is often the case in networks. Thus, the TRIE structure for the primary database provides fast access to a large amount of data as would be the case when the address recognition engine is to be used as a shared resource.

Each segment of the network address used as an index by the address recognition engines locates a node containing pointers to subsequent nodes, each pointer of a particular node being defined by one of the possible values of a subsequent segment of the address. The traversal of nodes starts at a root node and continues through a sequence of transition nodes according to the sequence of segments of the network address until a terminal or end node is reached. Each terminal node stores the pointer to the secondary database entry corresponding to the network address used to reach the terminal node. The entry in the secondary database pointed to by the primary database pointer contains information necessary for the router or bridge, as the case may be, to direct the data transmission towards its intended destination.

Each line card is coupled to one or more data transmission lines of a particular data transmission service. Each line card operates autonomously and includes all of the circuitry and logic required to process the physical and data link layers of the particular transmission service to transmit and receive data packets to and from the respective data transmission lines. Each line card includes a processor to perform data link and network layer processing for each data packet upon reception or for transmission of each data packet handled by the line card.

For each data packet received by a line card, the processor extracts the network destination address and passes the address as a "request" to the address recognition apparatus via the backplane bus. The address recognition engine reads each request and uses the address contained in the request as an index to the information database for lookup of a corresponding entry. A portion of the corresponding entry is returned to the line interface card as a "response" that is then read by the processor. The response includes the routing or bridging information required by the processor of the line card to direct the respective data packet to its intended destination.

In any scheme for transferring requests and responses between two devices coupled to one another by a backplane bus, it is necessary to interlock the devices so as to make certain that each request is properly identified to the responding device as a valid request. In addition, each response must be identified to the requesting device as a valid response. The validity of each request and its corresponding response is typically indicated in "ownership", information associated with each request, response pair.

When the ownership information indicates that the responding device "owns" a request, this represents a request written by a requesting device and yet to be processed for a response. Thus, the responding device will know that the request is to be used for lookup of a corresponding response. When the ownership information indicates that a response is owned by the requesting device, this represents a response returned by the responding device in respect of the corresponding request. Accordingly, the requesting device will know that the response should be used in the processing of the input data relating to that request. In this manner, requests and responses can be efficiently transferred between two devices without redundant processing of requests and with a positive indication of correspondence between each response and its respective request.

The present invention provides an interlocking scheme for the line cards and shared address recognition apparatus that reduces the total number of read/write operations over a backplane bus required to complete a request/response transfer. Thus, the line cards and address recognition apparatus are able to perform a large amount of request/response transfers with a high level of system efficiency. Generally, the interlocking scheme according to the present invention merges each ownership information storage location into the location of the request/response memory utilized to store the corresponding request/response pair. In this manner, the requesting line cards and responding address recognition apparatus can read or write the ownership information at the same time and during the same read/write operation used to read or write the respective request/response pair. Accordingly, the overhead imposed upon the backplane bus to complete request/response transfers between the line cards and the address recognition apparatus is reduced to provide a more efficient operation in the backplane bus system.

According to another feature of the interlock scheme of the present invention, each of the line cards and the address recognition engine includes a table for storing information relating to a plurality of database specifiers. Each of the database specifiers contains control information for the traversal of the primary and secondary databases. At the time the processor of a line card generates a request for the address recognition apparatus, it will analyze the protocol type information contained in the header of the respective data packet.

The processor will utilize the protocol type information as a look-up index to its database specifier table for selection of one of the database specifiers. The processor will then insert an identification of the selected database specifier into the request with the network address extracted from the data packet. The processor can readily cross reference protocol type information contained in each data packet to control information appropriate for the specific network protocol associated with a particular data transmission. In this manner, the address recognition engine is interlocked to control information for a multiple of routing and bridging protocols without the need for processing protocol type data.

Thus, the address recognition engine receives as a request a network address and an identifier to identify one of the database specifiers stored in its table. The address recognition engine traverses the primary and secondary databases according to the control information contained in the database specifier indexed by the identifier accompanying the network address.

For example, different protocols define different address sizes, formats and other information items that may be stored in the entries of the secondary database. To accommodate different sizes of network addresses according to the formats of different protocols, the TRIE of the primary database is arranged to have multiple root nodes to provide several traversal paths, each able to accommodate a different size and address format from among the possible network addresses that can be input to the address recognition engine. Each database specifier includes information on the root node to be used for a particular network address.

The interlock scheme provides an efficient interlock between several line cards and a shared address recognition resource by minimizing the number of backplane bus transactions required to complete request/response transfers and by implementing a streamlined method for exchanging database look-up control information between line card processors and the shared address recognition apparatus. Thus, an integrated backplane bus based system of line cards is feasible for coupling different data transmission services to one another for computer network integration.

BRIEF DESCRIPTION OF THE DRAWINGS

FIG. 8 illustrates an example of a network address and database specifier input to the address recognition engine of FIG. 1.

FIG. 8A illustrates a data block structure for the request/response RAM of FIG. 3.

FIG. 8B illustrates an example of the database specifier field of FIG. 8.

FIG. 8D is a table of information relating to the data block structure of FIG. 8C.

FIG. 8F is a table of information relating to the data block structure of FIG. 8E.

FIG. 8G is a summary of the data structure for the data block of FIG. 8E.

FIG. 12 is a block diagram for a node pointer of one of the nodes of the primary database of FIG. 10.

DETAILED DESCRIPTION

Figure 1:
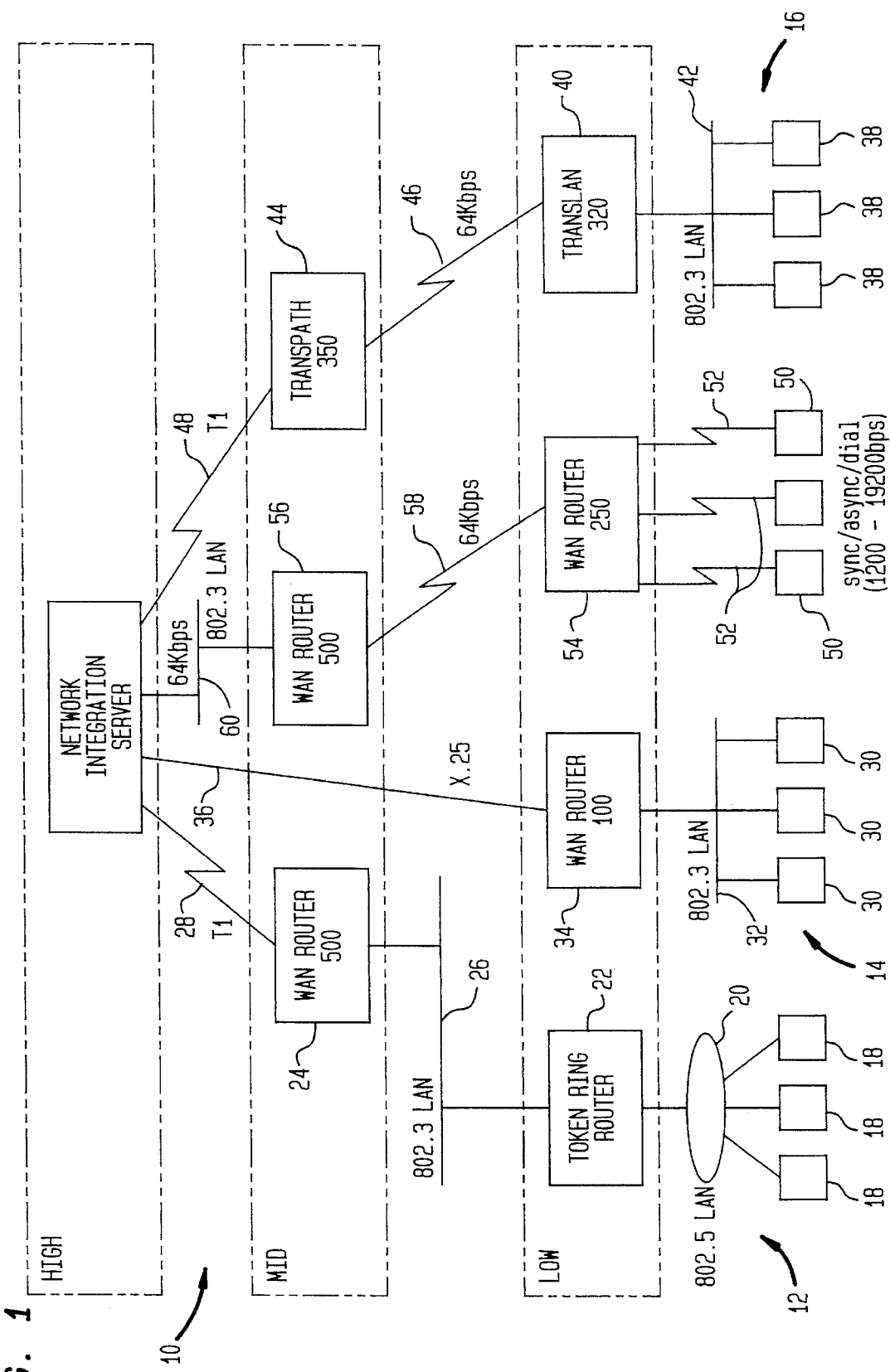
FIG. 1 is a block diagram of an exemplary computer network incorporating the interlock scheme of the present invention.

Referring now to the drawings, and initially to FIG. 1, there is illustrated, in block diagram form, an example of a computer network generally indicated by the reference numeral 10. The network 10 comprises a plurality of local area networks (LANs) including an 802.5 token ring LAN 12 and two 802.3 LANs 14, 16. The 802.5 LAN 12 comprises a plurality of personal computers 18, all coupled to one another by a token ring bus 20 for communication among the personal computers 18 within the LAN 12. A token ring router 22 is also coupled to the bus 20 and is further coupled to a wide area network (WAN) router 500 24 by an 802.3 bus 26 so that the personal computers 18 of the LAN 12 can communicate with other devices outside the LAN 12 via the token ring router 22 and WAN router 24. To that end, the WAN router 24 is coupled to a T1 data transmission line 28 for communication with, e.g., a personal computer of another LAN 14, 16, as will appear.

The 802.3 LAN 14 also comprises a plurality of personal computers 30 coupled to one another for communication within the LAN 14 by an 802.3 LAN bus 32. A WAN router 100 34 is coupled to the bus 32 and to an X.25 data transmission line 36 for transmission of data from any one of the personal computers 30 to outside the LAN 14. In a similar manner, the 802.3 LAN 16 comprises a plurality of personal computers 38 coupled to one another and to a Translan 320 bridge 40 by an 802.3 LAN bus 42. The bridge 40 is coupled to a Transpath 350 bridge 44 by a 64K bps data transmission line 46. The bridge 44 is further coupled to a T1 data transmission line 48 for bridging data between LANs.

Moreover, each of a plurality of personal computers 50 is coupled to a WAN router 250 54 of the network 10 by a point-to-point coupling 52. Each point-to-point coupling 52 may comprise a sync, async or dial 1200–19200 bps data transmission service. The WAN router 54 is, in turn, coupled to a WAN router 500 56 by a 64K bps data transmission line 58 and the router 56 is further coupled to an 802.3 LAN bus 60.

As should be understood from the above, a data transmission from any one of the computers 18 of the LAN 12 will be transmitted out of the LAN 12 via the router 22, 802.3 LAN bus 26 and router 24 onto a T1 transmission line, while data transmissions from any one of the computers 30, 38, 50 are ultimately routed out of their respective local operating environments via X.25, T1 and 802.3 LAN transmission services, respectively. In addition, the personal computers 38 of the LAN 16 utilize a bridge for communication with personal computers of other LANs while the personal computers 18, 30, and 50 are coupled to routers. Accordingly, if a user application such as electronic mail were running on each of the computers 18, 30, 38 and 50, it is necessary to provide a multi-protocol routing and bridging service in the network 10 so that a mail message from, e.g., one of the computers 18 of the LAN 12 can be transmitted via the T1 transmission service and received through the 802.3 LAN service by, e.g., one of the computers 50.

To that end, a network integration server 62 is coupled to each of the transmission lines 28, 36, 48 and 60 to receive data transmissions, typically in the form of data packets, from any one of the transmission lines 28, 36, 48 and 60 and to route or bridge each data packet out on any one of the transmission lines 28, 36, 48 and 60. The network integration server 62 provides, in a single device, network connectivity between any number of different user applications running on the various computers 18, 30, 38 and 50 by providing a mapping scheme between the user application services available on the constituent computers 18, 30, 38 and 50 of the network 10 and the multiplicity of transmission services that may be used throughout the network 10. In this manner, a mail message, e.g., received from one of the computers 18 over the T1 transmission line 28 can be routed by the network integration server 62 to one of the computers 50 via the 802.3 LAN 60, router 56, 64K bps line 58, router 54 and point-to-point coupling 52.

Figure 2:
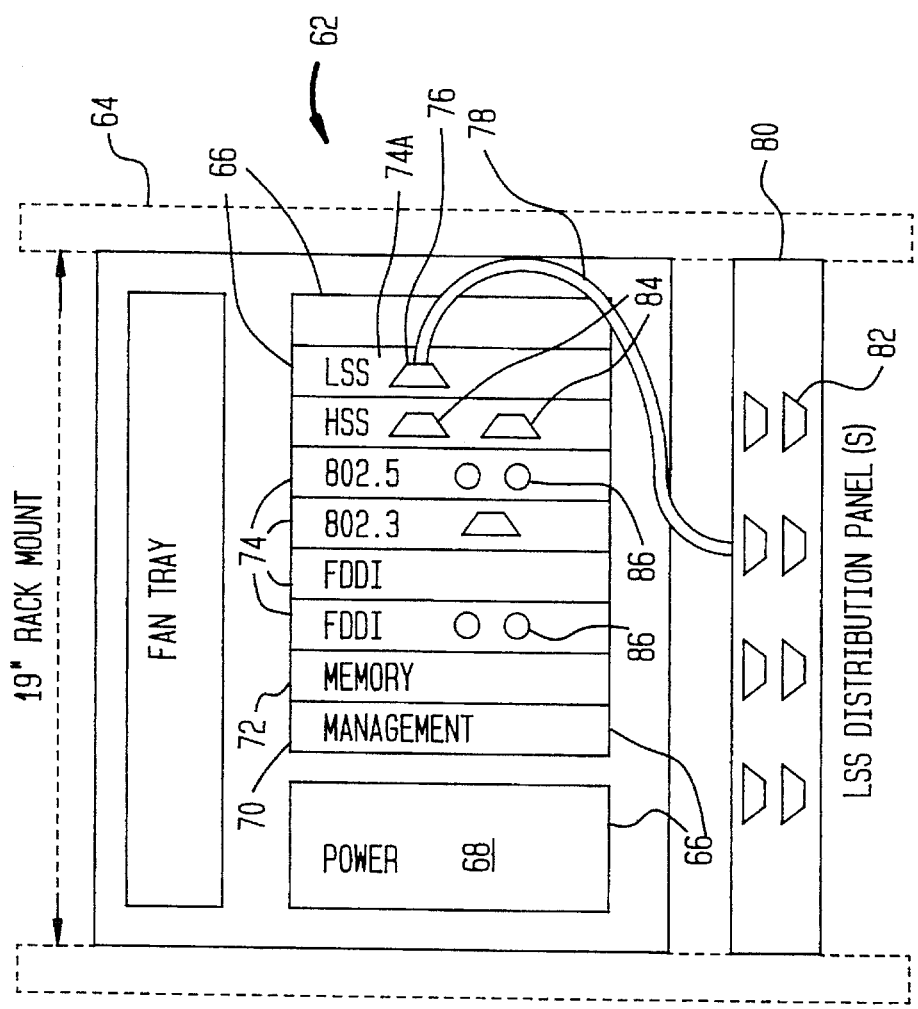
FIG. 2 is a schematic representation of an exemplary embodiment for the physical hardware configuration of the network integration server of FIG. 1.

Referring to FIG. 2, there is illustrated schematically an exemplary embodiment for the physical hardware configuration of the network integration server 62. A standard 19" rack 64 having a backplane bus (not illustrated here, see FIG. 3) is arranged with slots, in a known manner, to slidably receive and mount circuit cards 66. The rack 64 can include nine slots. The circuit cards 66 include a power card 68 physically received into two of the slots to provide a power source to each of the cards 66 operating in the server 62, a management card 70 received into one of the slots for initialization, control and management of the operating cards 66 including input and update of routing information relevant to the network, a memory card 72 received into another of the slots for centralized shared memory services, as will be explained in more detail below, and a series of line interface cards 74, each received into one of the remaining seven slots of the rack 64.

Each line interface card 74 operates autonomously and includes all of the circuitry and logic required to process the physical and data link layers of a particular transmission service protocol, e.g. one of the T1 and X.25 transmission services. In addition, each line interface card 74 includes a network layer processor for the network protocols supported by the respective line interface card 74. The shared memory card 72 provides centralized network routing and bridging information services to the network layer processors of the line interface cards 74. Each line interface card 74 can communicate with any one of the other line interface cards 74 via the backplane bus to affect the transfer of each data packet received at the respective line interface card 74 according to the network routing or bridging information obtained from the shared memory card 72, to one of the other line interface cards 74 for transmission out of the network integration server 62. Each line interface card 74 is provided with a port or ports for physical and electrical connection to a transmission line operating according to the transmission service supported by the respective line interface card 74. For example, line interface card 74A can support a low speed synchronous transmission service through a modem and is provided with a 50 pin port 76 on a front panel for coupling with a 50 wire cable 78. The 50 pin port-50 wire cable arrangement 76, 78 is used for a fan out of lines required to service eight modem connections. The cable 78 is coupled to a remote distribution panel 80 mounted to the rack 64 below the slots used to mount and support the cards 66. The remote distribution panel includes eight ports 82 for coupling to eight different modems (not illustrated). The remaining cards 74 are each provided with appropriate ports 84, 86 on the respective front panel for coupling directly to transmission line(s) operating according to the transmission service supported by the respective line interface card 74.

The rack and slot configuration for the physical hardware support structure provides a modular design for flexibility and expandability. The network integration server 62 can be rearranged to handle additional or different transmission services simply by adding or replacing line interface cards 74 as required by the various types of transmission services used in a particular network. In addition, the autonomous performance of all the physical and data link processing on each line interface card for the transmission service supported by the line interface card, results in a high performance data transmission capacity that can be increased incrementally by adding line interface cards 74 to the rack 64 as data traffic on the network increases.

Figure 3:
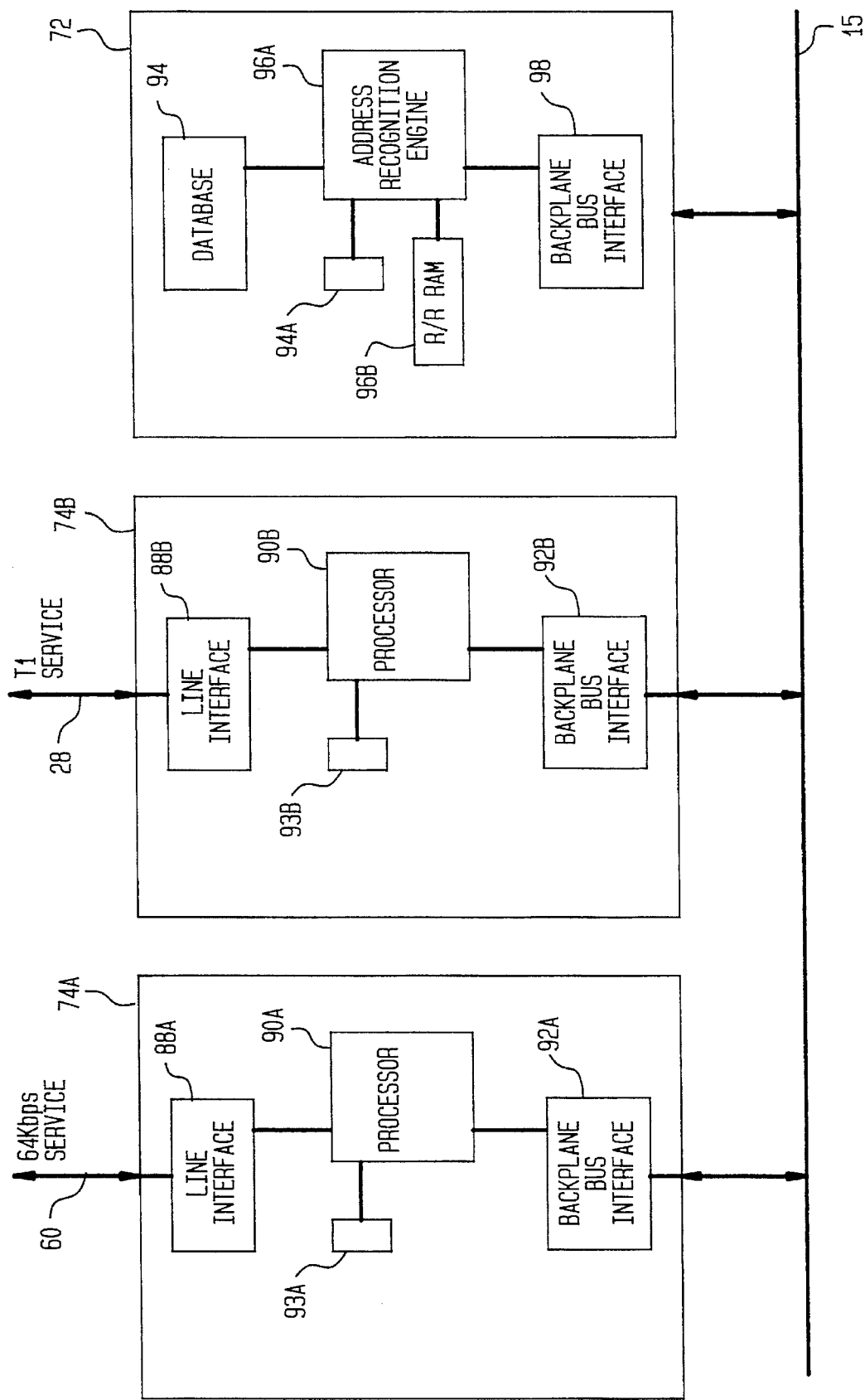
FIG. 3 is a block diagram of a high level representation of the architecture for a shared memory card and line interface cards of the computer network of FIG. 1.

FIG. 3 shows, in block diagram form, a high level representation of the architecture for the shared memory card 72 and line interface cards 74A, 74B of the network integration server 62. The network integration server 62 is a backplane based system used to provide network connectivity among dissimilar data transmission services. FIG. 3 illustrates two line interface cards 74A and 74B. The line interface card 74A supports a low speed synchronous transmission service such as a 64K bps service, while line interface card 74B supports a T1 transmission service. It should be understood that the specific transmission services described in respect of the line interface cards 74A, 74B are representative as a line interface card for any particular transmission service can be provided on the network integration server 62, as required by the network.

Generally, each line interface card 74A, 74B comprises a line interface 88A, 88B coupled to the respective transmission line 60, 28, a processor 90A, 90B for data link processing, network layer routing and bridging processing and management transactions and a backplane bus interface 92A, 92B, respectively. Each processor 90A, 90B is coupled to a table 93A, 93B, respectively, for storage of identifiers for database specifiers, as will be described below. The memory card 72 comprises an address recognition engine 96A and request/response RAM 96B for centralized routing and bridging information services available to the line interface cards 74A, 74B, a lookup database 94, a table 94A and a backplane bus interface 98.

A high performance asynchronous backplane bus 15 is coupled to each of the memory card 72 and line interface cards 74A, 74B via the respective backplane bus interfaces 92A, 92B, 98. The backplane bus 15 operates according to the Futurebus IEEE Backplane Bus Specification (ANSE/IEEE Std 896.1) to provide communication services between the line interface cards 74A, 74B and the memory card 72.

Each line interface 88A, 88B provides the physical and electrical connectivity to the respective data transmission line 60, 28 for bit transmission. For example, each line interface 88A, 88B is coupled by a distribution panel or adapter cable to an RS232, RS422/449, V.35 or X.21 leased telephone line and is adapted to transmit and receive serial bits of a data packet according to the electrical and physical specification of the leased line. In addition, each line interface 88A, 88B formats the serially transmitted bits into data packets according to the data link protocol utilized in the respective transmission service, as for example one of the standard HDLC, LAPB or PPP data links.

Each processor 90A, 90B performs the data link and network layer routing or bridging processing required upon reception or for transmission of each data packet by the respective line interface 88A, 88B. The network layer processing is performed by the processor 90A, 90B according to the network layer protocol utilized in the domain coupled to the respective transmission service, as for example, one of the OSI, IP and DECnet network protocols, the IS-IS multiprotocol routing scheme and/or a bridging protocol. The processor 90A, 90B analyzes the format of each data packet to determine the network layer protocol do be used for that data packet.

The memory card 72 provides centralized database services for all of the line interface cards 74 in the network integration server 62. These services include the address recognition engine 96A which is coupled to each of the information look-up database 94 and the table 94A for storage of database specifiers, as will appear. For each data packet received by a line interface card 74A, 74B, the processor 90A, 90B extracts the network destination address and passes the address as a "request" to the request/response RAM 96B via the bus 15. The address recognition engine 96A reads each request in the request/response RAM 96B and uses the address contained in the request as an index to the routing information database for lookup of a corresponding entry. A portion of the corresponding entry is placed in the request/response RAM 96B as a "response" that is then read by the processor 90A, 90B again via the bus 15. The response includes routing information that indicates which line interface card 74 of the network integration server 62 is to get the data packet corresponding to the request/response for transmission out of the network integration server 62. The requests and responses are communicated between the line interface cards 74 and the address recognition engine 96A through a device interlocking scheme feature of the present invention that is implemented in the request/response RAM 96B, as will be described in more detail below.

Figure 4:
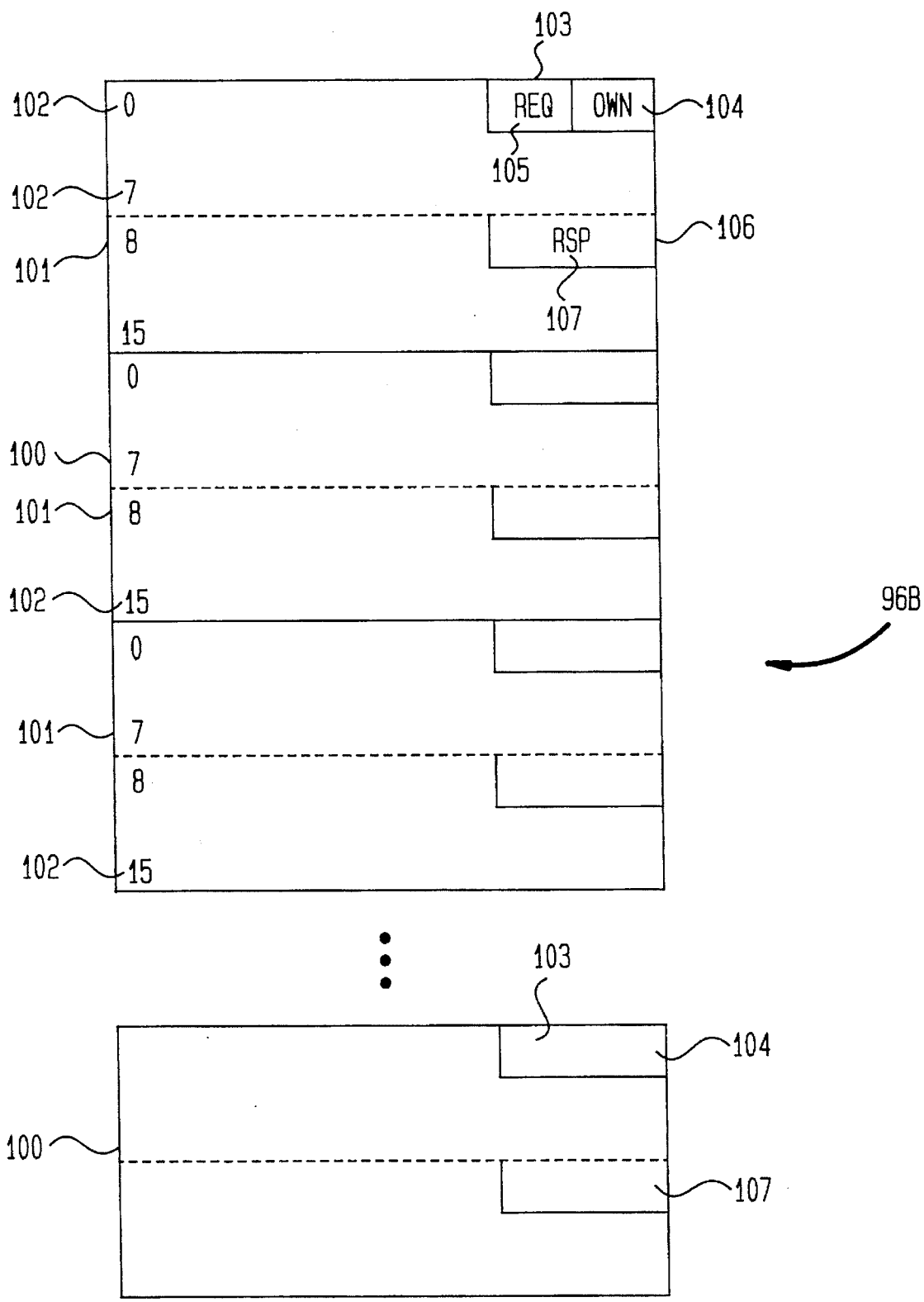
FIG. 4 illustrates a data block structure for the request/response RAM of FIG. 3.

Referring now to FIG. 4, there is illustrated in more detail a data block structure for the request/response RAM 96B. The request/response RAM 96B provides an interlock mechanism between each processor 90A, 90B and the address recognition engine 96A for an exchange of request and response information. The request/response RAM 96B is divided into a plurality of rings 100, e.g. 32 rings, with each ring 100 being dedicated to one of the processors 90A, 90B. Each of the processors 90A, 90B may have one or more rings allocated to it depending on the data traffic expected through the processor 90A, 90B so as to properly balance the servicing of requests by the address recognition engine 96A. For example, the processor 90A may have more allocated rings 100 than the processor 90B. Each ring 100 is further divided into a plurality of entries 101, as for example, 16 entries 101 per ring 100.

As illustrated in FIG. 4, each entry 101 has sufficient memory space to store 16 longwords 102, designated as 0 to 15 in each entry 101. A first set of eight longwords, 0–7, of each entry 101 is used to store a request. A second set of eight longwords, 8–15, of each entry 101 is used by the address recognition engine 96A to store the response corresponding to the request stored in longwords 0–7 of the respective entry 101.

Each processor 90A, 90B maintains a pointer mechanism including a first pointer to indicate the location of a next entry 101 in one of its rings 100 in the request/response RAM 96B that is available to store a request. The first pointer will increment to a next location after each request is stored in the request/response RAM 96B. In addition, a second pointer of the pointer mechanism indicates the location of a previously used entry 101 that should be accessed for reading of a response. The second pointer is also incremented after the processor 90A, 90B reads the response.

The first and second pointers are initialized to point to the same entry location and will each continuously loop around the ring or rings allocated to the respective processor 90A, 90B as they are incremented. If the first pointer loops around the ring 100 faster than the rate at which the processor 90A, 90B reads responses from the request/response RAM 96B, (i.e., faster than the address recognition engine 96A can service requests) the location pointed to by the first pointer will eventually coincide with the location pointed to by the second pointer. At that time, the processor 90A, 90B will stop sending requests to the request/response RAM 96B until the second pointer has been incremented to point to another entry in the ring 100.

The address recognition engine 96A polls each ring 100 of the request/response RAM 96B on a round robin basis, for requests to service. The address recognition engine 96A reads one entry 101 of each ring 100 as it polls each ring 100 and continues polling to eventually read all of the entries 101.

During the exchange of requests and responses between the processors 90A, 90B and the address recognition engine 96A, it is necessary to communicate the validity of a request or a response in a particular entry 101 to the address recognition engine 96A or processor 90A, 90B, respectively. In other words, the address recognition engine 96A must be able to determine whether a request in an entry 101 that it polls is one that should be serviced (valid) or one that has already been serviced and thus should not be read (invalid). Similarly, a processor 90A, 90B must be able to determine whether a response in an entry 101 is the response to the request that it last stored in the entry 101 (valid) or a stale response corresponding to a previous request (invalid).

Pursuant to a feature of the present invention, the interlock between the processors 90A, 90B and the address recognition engine 96A provides for "ownership" information to be stored in dedicated bytes of each request and each response memory space of each entry 101 as an indication of the validity of the data in the respective memory space of the entry 101. Moreover, the setting and clearing of the ownership information is performed by both the processors 90A, 90B and the address recognition engine 96A during their respective read and write operations in respect of requests and responses to minimize the total number of bus transactions required to complete the request/response transfer. This minimizes the bus transaction overhead for the transfer of a request/response pair through the computer system 10 and, therefore, further facilitates the prompt completion of the bus transactions required for the return of responses to the processors 90A, 90B.

Referring once again to FIG. 4, the first byte 103 of the first set of longwords 102 (longwords 0–7 of each entry 101 for storage of a request) is dedicated to store an OWN_ID bit 104 and a REQ_ID bit 105. In addition, the first byte 106 of the second set of longwords 102 (longwords 8–15 of each entry for storage of a response) is dedicated to store a RSP_ID bit 107. The OWN_ID, REQ_ID and RSP_ID bits 104, 105, 107 together provide the ownership information necessary for an indication of the validity of data stored in the respective entry 101. Moreover, the storage of the OWN_ID and REQ_ID and RSP_ID bits at the request and the response memory spaces of each entry 101, respectively, allows for the reading and changing of ownership information within the same read/write operations for the respective request/response pair, as will appear.

Figure 5:
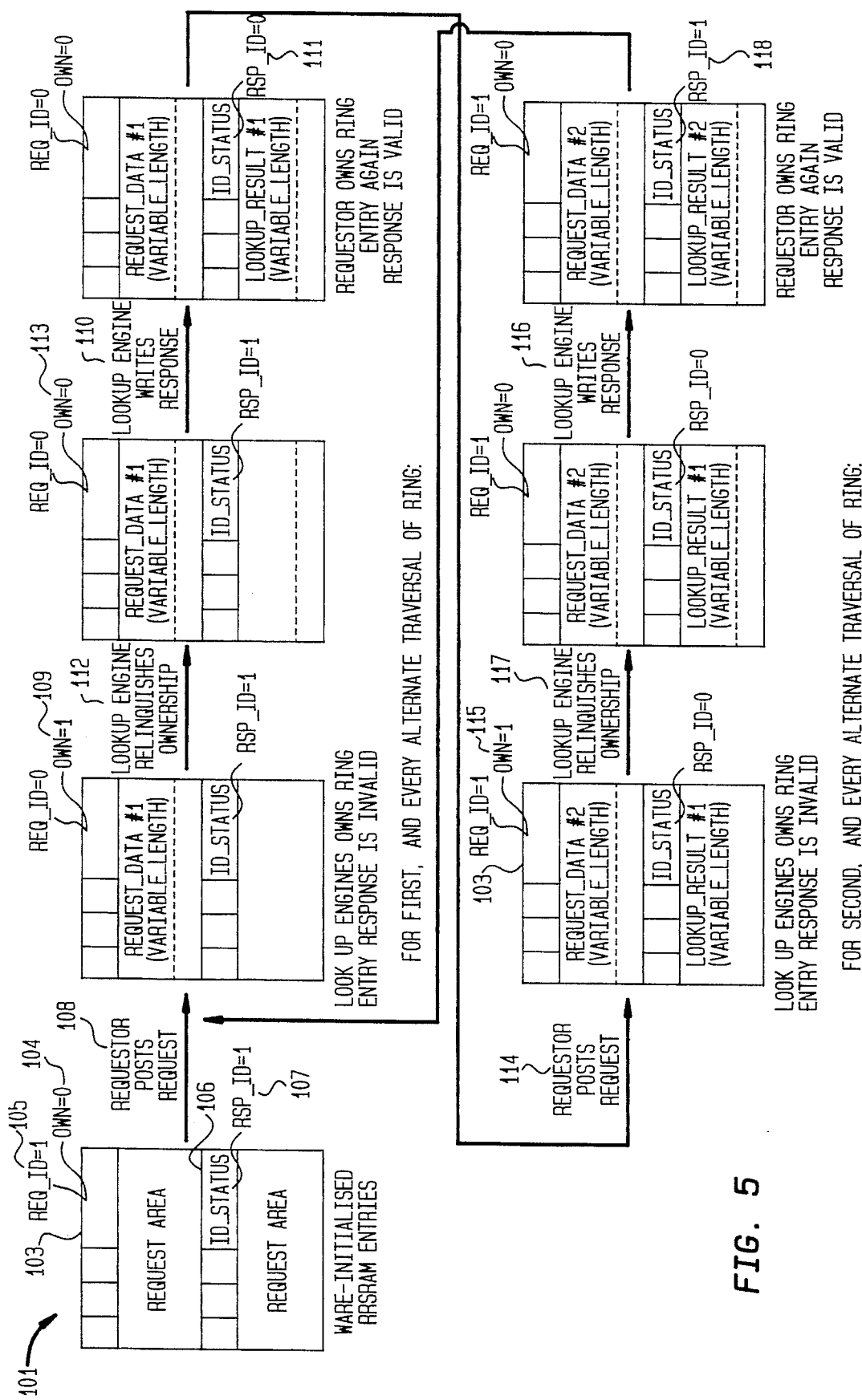
FIG. 5 is a flow diagram for reading and writing ownership information in the data block structure of FIG. 4.

Referring now to FIG. 5, there is illustrated a flow diagram for the reading and changing of ownership information by the processors 90A, 90B and the address recognition engine 96A during their respective read and write operations in a request/response transfer for validation and verification of validation of the request and response data stored in a respective entry 101 of a ring 100. At initialization of the system, the OWN_ID bit 104 is negated and each of the REQ_ID bit 105 and RSP_ID bit 107 is asserted. In FIG. 5, the asserted state for each bit is indicated by a logical 1 and the negated state is indicated by a logical 0.

When a processor 90A, 90B sends a request over the bus 15 to the request/response RAM 96B, the processor 90A, 90B will address the request to longwords 0–7 of the entry 101 currently pointed to by the first pointer and include a first byte in the request that asserts the OWN_ID bit 104 and negates the REQ_ID bit 105. The location of the first pointer relative to the second pointer will verify that the entry 101 is available. When the address is stable on the bus 15, the address recognition engine 96A will recognize a request/response RAM address and pass the request directly to the request/response RAM 96B over the coupling 24 between the request/response RAM 96B and the address recognition engine 96A, as illustrated in FIG. 3.

The request will be written into the location of longwords 0–7 of the addressed entry 101 in the request/response RAM 96B, including the first byte that asserts the OWN_ID bit 104 and negates the REQ_ID bit 105 (see 108, 109). At this time, the address recognition engine 96A owns the entry 101 (indicated by the asserted OWN_ID bit 104) and the response currently in the entry 101 is invalid (indicated by the mismatch between the now negated REQ_ID bit 105 and the asserted RSP_ID bit 107). The processor 90A, 90B will follow the convention of asserting the OWN_ID bit and negating the REQ_ID bit during the first and every alternate traversal of the respective ring 100 when writing requests to the request/response RAM 96B.

During the polling operation, the address recognition engine 96A will eventually read the request in the entry 101. The asserted OWN_ID bit 104 tells the address recognition engine 96A that it owns the request (see 109). In order to permit the writing of requests that vary in length, each of the OWN_ID bit 104 and REQ_ID bit 105 is written into the first byte of the first longword 102 of the entry 101 so that a fixed convention for a validity indication can be followed despite the variable length of the request. The processor 90A, 90B will, therefore, write the ownership information at the beginning of a write operation and then continue to write the request. The address recognition engine 96A must be able to determine that the OWN_ID bit 104 in the first longword 102 is associated with a request that has been completely written into the respective entry 101 (i.e., the processor 90A, 90B has completed its write operation to the request/response RAM 96B).

Figure 6:
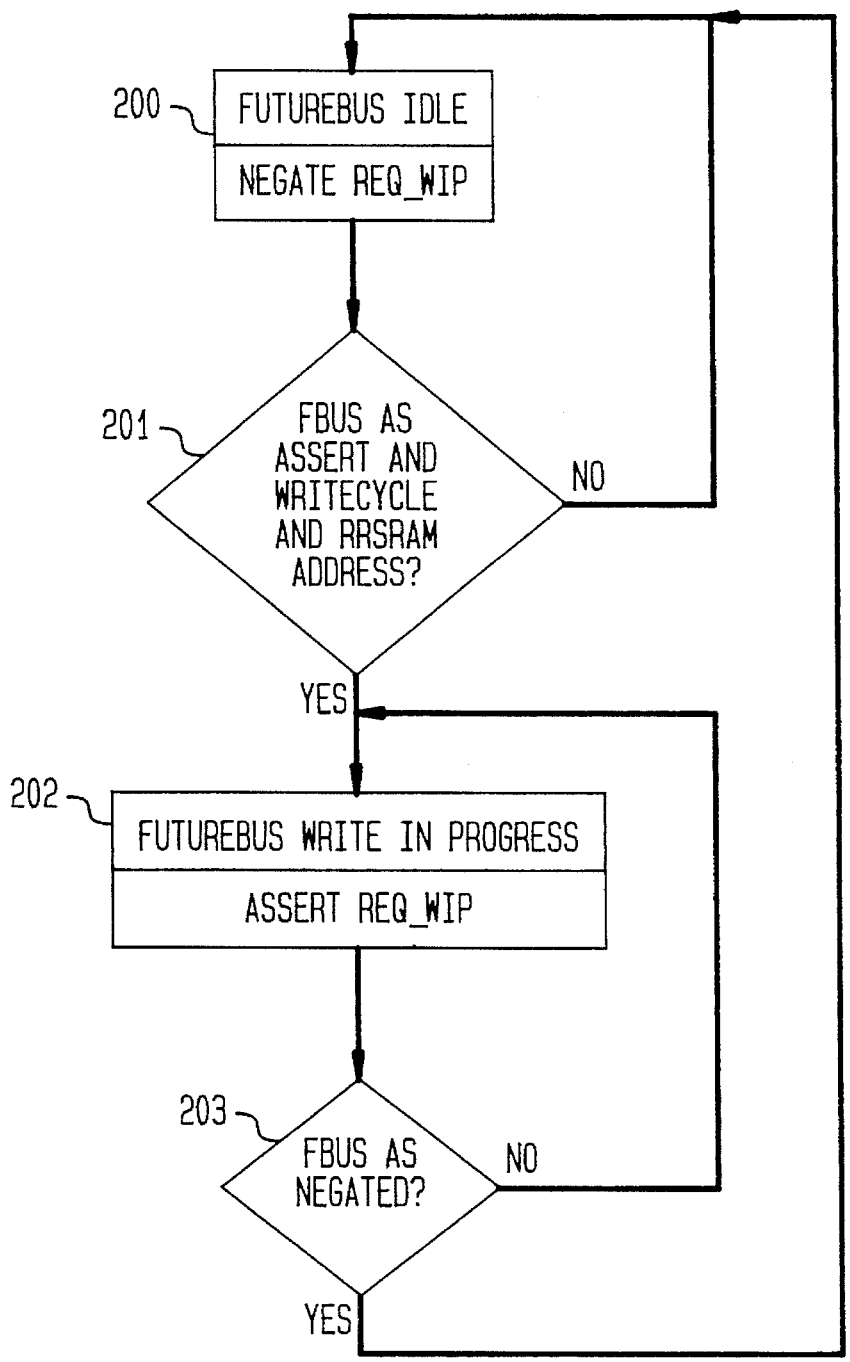
FIG. 6 is a flow diagram of the operation of the database of FIG. 1.

Referring now to FIG. 6, there is illustrated a flow diagram for a portion of the hardware operation of the address recognition engine 96A utilized to make certain that the write operation for a request associated with an asserted OWN_ID bit 104 has been completed. The address recognition engine 96A is arranged to assert a REQ_WIP signal whenever a write to the request/response RAM 96B through the bus 15 is in progress. In step 200 of the operation of the address recognition engine 96A, the address recognition engine 96A initially assumes that the bus 15 is idle. In step 201, the address recognition engine 96A monitors the bus 15 to determine whether the AS* signal of the Futurebus asynchronous bus protocol is asserted on the bus 15, the processor 90A, 90B has asserted a command for a write operation and the address placed on the bus 15 during the connection phase is for the request/response RAM 96B.

If this determination is negative, the operation of the address recognition engine 96A loops back to step 200. However, if this determination is positive, the address recognition engine 96A asserts the REQ_WIP signal in step 202. The address recognition engine 96A will continue to monitor the bus 15 until the AS* signal is negated (step 203). Prior to the negation of the AS* signal, the address recognition engine 96A loops back to step 202 and continues to assert the REQ_WIP signal. Upon the negation of the AS* signal by the processor 90A, 90B, to indicate the disconnection phase of the respective bus transaction, the address recognition engine 96A loops back to step 200 and negates the REQ_WIP signal. Thus, the operation of the address recognition engine 96A, as illustrated in FIG. 6, provides a positive indication (the REQ_WIP signal) whenever a write operation to the request/response RAM 96B is in progress.

Figure 7:
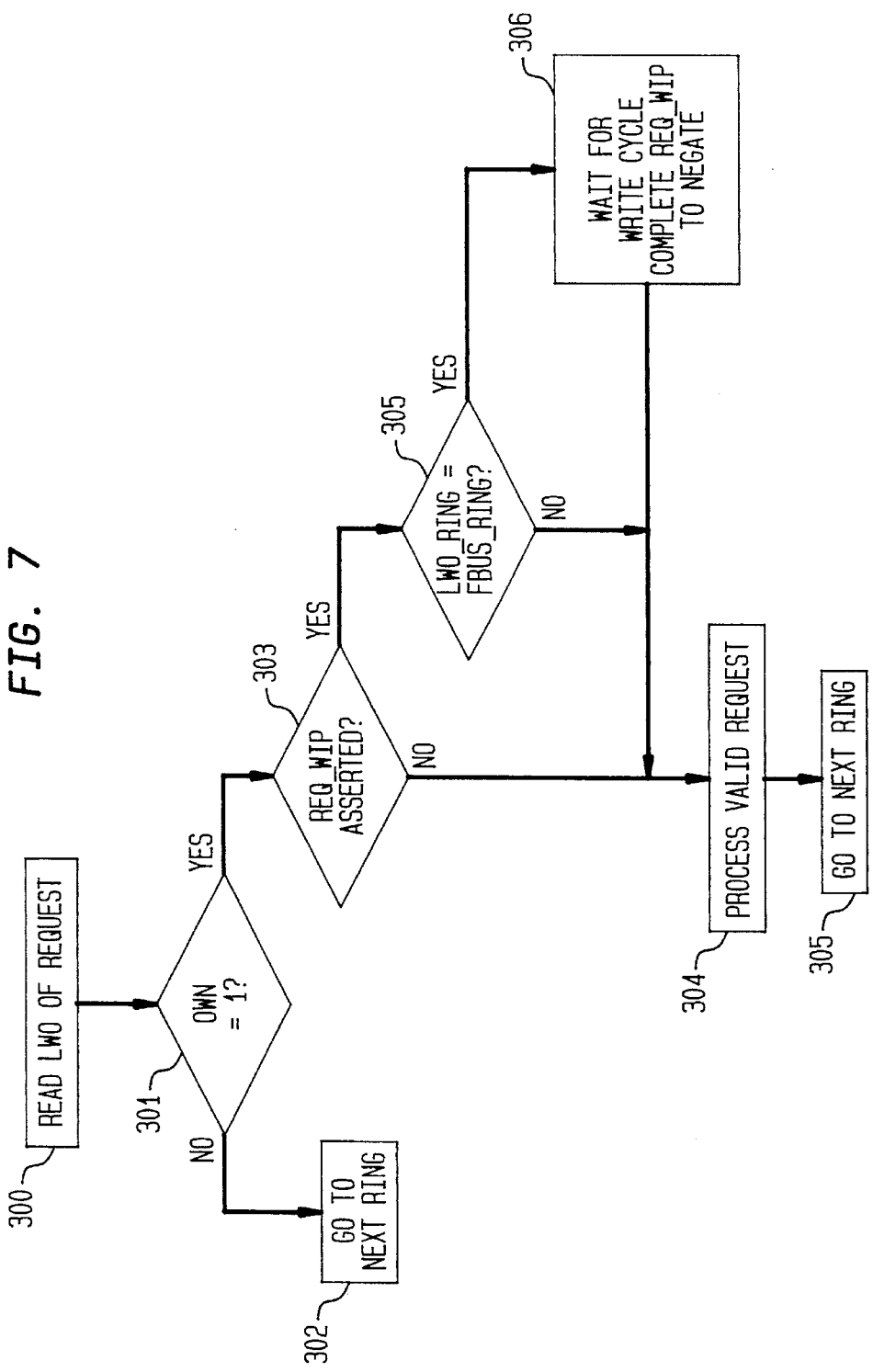
FIG. 7 is a flow diagram of the operation of the database during the reading of a request in the request/response RAM of FIG. 1.

Referring now to FIG. 7, there is illustrated a flow diagram for the operation of the address recognition engine 96A during the reading of a request. In step 300, the address recognition engine 96A reads longword 0 of the entry 101 including the OWN_ID bit 104. In step 301, the address recognition engine 96A determines whether the OWN_ID bit 104 is asserted. If it is not asserted, the address recognition engine 96A continues the polling process to a next ring 100 (step 302). However, if the OWN_ID bit 104 is set, as in the example illustrated at 109 of FIG. 5, the address recognition engine 96A determines whether the REQ_WIP signal is also asserted to indicate that a write of a request to the request/response RAM 96B is in progress (step 303).

If the REQ_WIP signal is not asserted, the address recognition engine 96A continues to process the request and then moves on to a next ring 100, according to the polling scheme (steps 304, 305).

Referring back to FIG. 5, the address recognition engine 96A will relinquish ownership of the entry 101 upon reading a valid request by writing a negated OWN_ID bit 104 to the first byte of longword 0, 112, 113. After the address recognition engine 96A services a request, it writes the corresponding response into longwords 8–15 of the entry 101 as indicated at 110. The first byte of the response, in longword 8, includes an RSP_ID bit 107 that matches the RSP_ID bit 107 written by the processor 90A, 90B when it wrote the request to longwords 0–7 of the entry 101, as described above. In this instance, the RSP_ID bit 107 is negated as shown at 111.

The address recognition engine 96A must therefore access the request/response RAM 96B three times during the servicing of each request, once to read the request, once to negate the OWN_ID bit 104 and once to write the response, including the RSP_ID bit. However, due to the point-to-point coupling 24 between the address recognition engine 96A and the request/response RAM 96B, there is no overhead on the bus 15.

The processor 90A, 90B accesses the entry 101 during a subsequent bus transaction when the second pointer points to the entry 101. At that time, the processor accesses and reads longwords 8–15 of the entry 101 for the response and the RSP_ID bit 107. The processor 90A, 90B will know that the response is valid when the RSP_ID bit 107 written by the address recognition engine 96A matches the REQ_ID bit written by the processor 90A, 90B when it wrote the request. As shown at 109 and 111, the processor 90A, 90B negated the REQ_ID bit 105 when writing the request and the address recognition engine 96A negated the RSP_ID bit 107 when writing the response. If the REQ_ID bit does not match the RSP_ID bit, the response is not valid (i.e. the address recognition engine 96A has not yet serviced the request) and the processor 90A, 90B must read the response again at a later time.

In this manner, the processor 90A, 90B is able to complete the request/response transfer in two bus transactions over the bus 15. During the write operation for the request, the processor 90A, 90B need only access the request longwords 0–7 of the entry to write the ownership information in the OWN_ID bit 104 and the REQ_ID bit 105. During the read operation for the response, the processor 90A, 90B need only access the response longwords 8–15 of the entry to determine the validity of the response through a match between the REQ_ID bit 105 that it wrote during the write request operation and the matching RSP_ID bit 107 that the processor 90A, 90B reads during the second bus transaction.

As is the case with requests, each response can be of variable length. Thus, the RSP_ID bit 107 is also written into the first byte of the first longword 102 so that a fixed convention for a validity indication can be followed despite the variable length of the response. The address recognition engine 96A operates to hold any read for a response if it is currently writing the response to the address indicated in the read. This will insure that RSP_ID bit 107 in the first longword 102 of the response is associated with a response that has been completely written by the address recognition engine 96A.

For a second and every alternate traversal of the ring 100 by the processor 90A, 90B, the first byte 103 written by the processor 90A, 90B (114) asserts each of the OWN_ID bit 104 and the REQ_ID bit 105, as shown at 115. The REQ_ID bit 105 is asserted in the second and each alternate traversal of the ring 100 to again cause a mismatch between the REQ_ID bit 105 and the RSP_ID bit 107 since the address recognition engine 96A negates the RSP_ID bit 107 during the response write operation of the first and each alternate traversal of the ring 100. The write response, relinquish ownership and read response operations 116, 117 for the second and each alternate traversal is similar to the operations for the first and each alternate traversal of the ring 100, except that the address recognition engine 96A now asserts the RSP_ID bit 107 when writing a response, to provide a match with the asserted REQ_ID bit 105, as shown at 118.

Referring again to FIG. 7, if, during a request read operation by the address recognition engine 96A, the REQ_WIP signal is asserted 303, the address recognition engine 96A compares the address of longword 0 of the entry being accessed for a request read operation with the address of the entry on the bus 15 for which a request write operation is in progress (305). If there is a mismatch, the address recognition engine 96A proceeds to process the request (304). However, if there is a match, the address recognition engine 96A waits for the write operation to complete, i.e. a negation of the REQ_WIP signal (306). Thereafter, the address recognition engine 96A proceeds to process the request (304).

An example of a request 403 is shown in FIG. 8. The request 403 comprises an N bit network address 403A, for example, a 16 bit address, and a database specifier index field 403B. The format for each request 403 and the structure for the entries 101 of the request/response RAM 96B permit a programmable request/response setup.

For example, referring to FIG. 8A, there is illustrated an encoded stream of N requests that are concatenated and written into the request portion of a single entry 101. The handshake byte comprises the OWN_ID 104 and REQ_ID 105 bits of the request/response interlock described above. A series of N requests are then written with the OWN_ID and REQ_ID information to an entry 101 of the request/response RAM 96B with a "terminator" request ending the byte stream of the concatenated byte stream.

Moreover, each request can be one of several types formatted as either a type-value or type-length-value encoded byte stream, as will be described.

The request/response entry example of FIG. 4 represents a type-value encoded stream with a total fixed length of 16 longwords for the request and response. The example of FIG. 4 is a parser type request that is used in a regular look-up operation of the address recognition engine 96A.

FIG. 8B illustrates an example of the database specifier index field 403B formatted to indicate both a database specifier index and a request type. A first five bit value, for example, is used to identify a particular database specifier for control of the look-up operation, as will appear. A second set of two bits is used to identify a request type. In addition to the parser type request, there can be, for example, an interrogative type request and a maintenance type request.

Figure 8C:
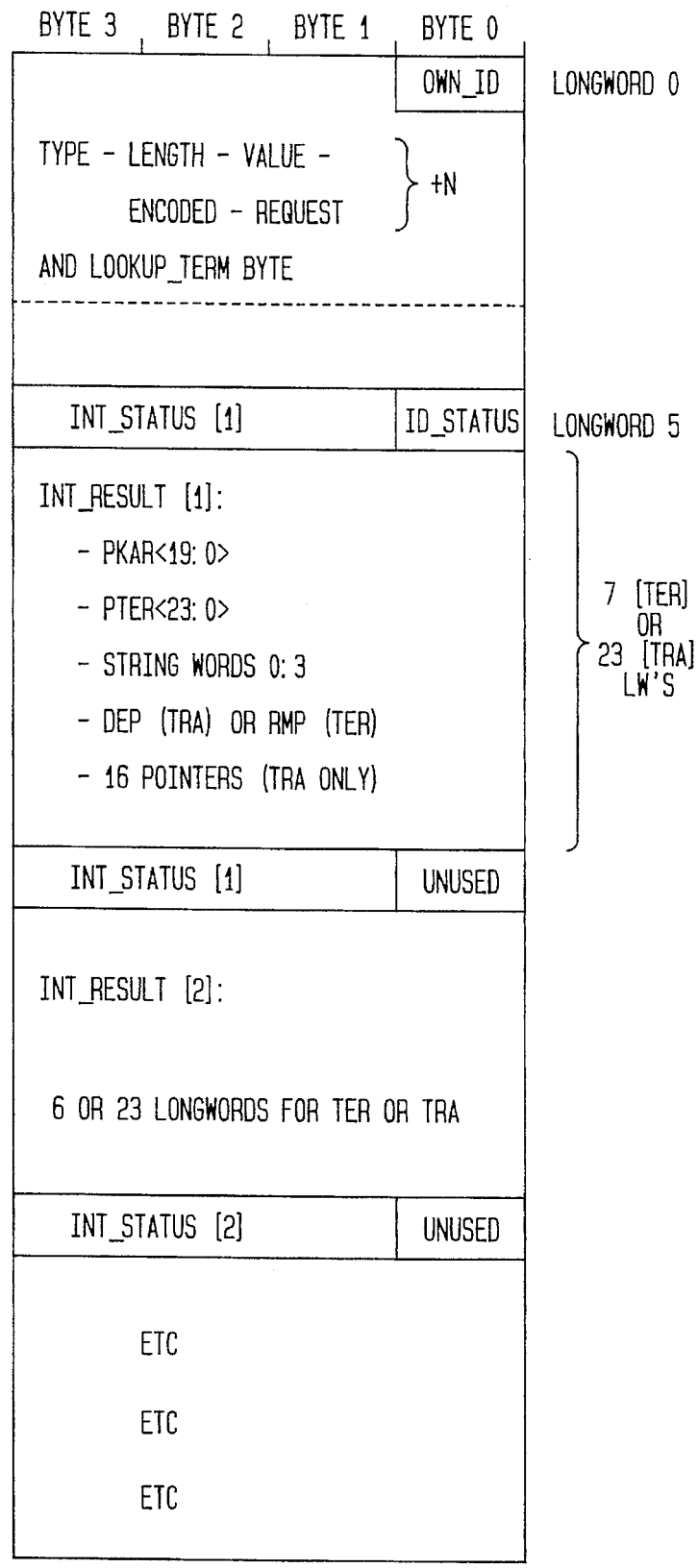
FIG. 8C illustrates a further data block structure for the request/response RAM of FIG. 3.

The interrogative type request is used to return, in a response, information on the look-up operation of the address recognition engine, for example, when a match for a network address is not found in the look-up. FIG. 8C illustrates the structure for the request/response entry 101 when formatted for an interrogative type request and the table of FIG. 8D shows the information contained in a response to an interrogative request. The TRA and TER designations in the table of FIG. 8D refer to transition and termination nodes of the look-up database, as will be described below in the detailed description of the database 94. The response information indicates details of the traversal of the database 94 and where the search ended.

Figure 8E:
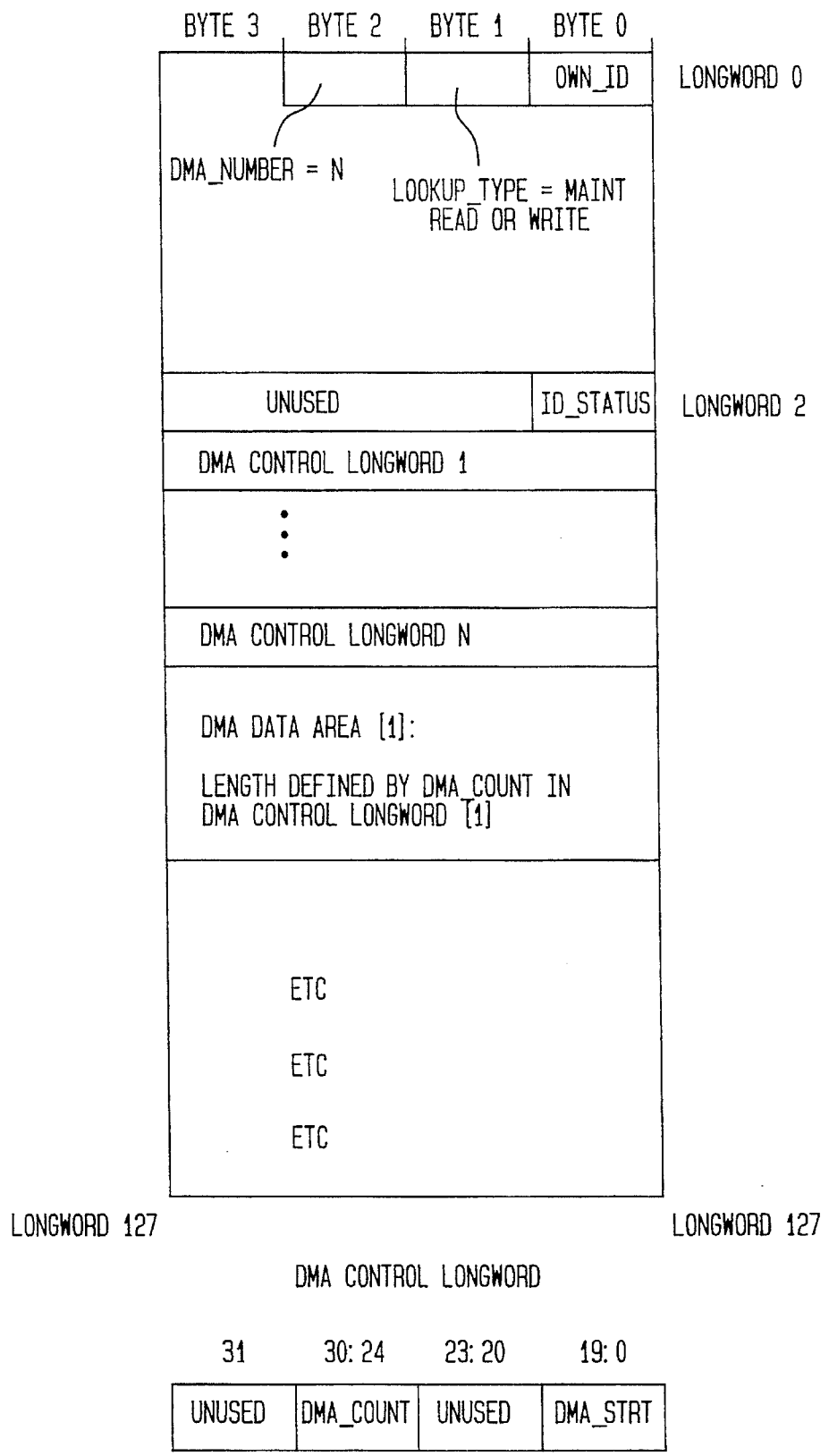
FIG. 8E illustrates another data block structure for the request/response RAM of FIG. 3.

The maintenance type request can be either a read or write operation and enables a direct memory access operation (DMA) to the database 94. This type of request can be used to read or write blocks of the database 94 to maintain the information of the database. FIG. 8E illustrates the structure for the request/response entry 101 when formatted for a maintenance type request. FIG. 8F is a table showing control parameters for a DMA operation using the request/response interlock and FIG. 8G is a summary of a request/response entry 101 in a maintenance DMA operation. Thus, preselected blocks of the database are readily accessible to review information stored in the database 94 (read DMA) or to write new or updated information directly into the database (write DMA).

As illustrated in FIGS. 8C and 8E, the request/response entry 101 is expanded to a 128 longword space to accommodate longer interrogative and DMA responses. The request type field of the database specifier index 403B provides increased flexibility in the operation of the address recognition engine 94A for maintaining and monitoring the database 94.

Figure 9:
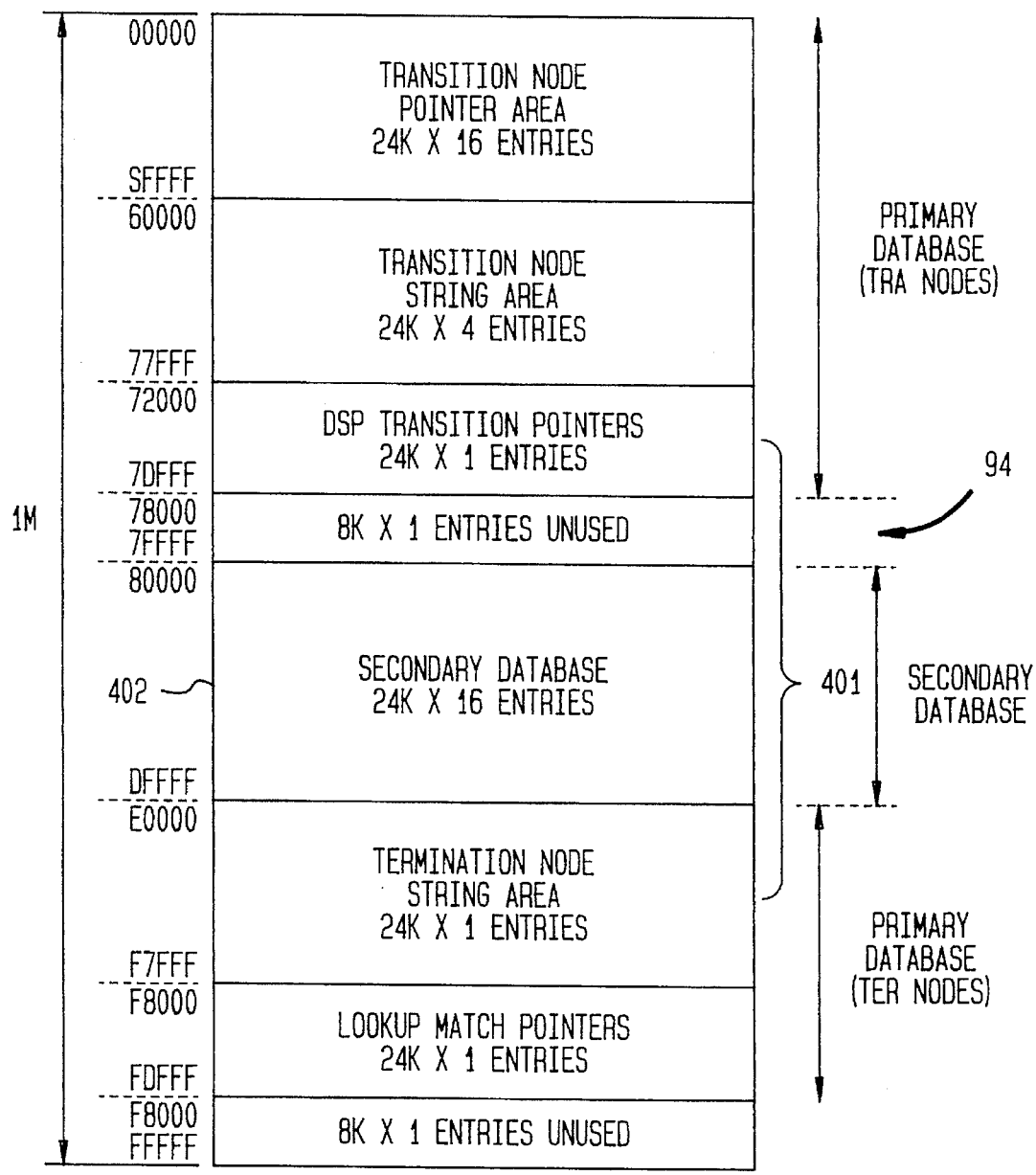
FIG. 9 is a memory map of the memory of the look-up database of FIG. 1.

Referring now to FIG. 9, there is illustrated a memory map for the look-up database 94 of the address recognition engine 96A. As described above, the address recognition engine 96A uses a network address that is stored in the request portion of an entry in the request/response RAM 96B as an index to the database 94 to locate an entry in the database 94. The entry in the database 94 contains the network information relating to the network address that is returned by the address recognition engine 96A to the request/response RAM 96B as a response. The processor 90A, 90B in the line card 74A, 74B utilizes the response to process the network information for transmission of the data packet to its intended destination.

The database 94 is divided into a primary database 401 and a secondary database 402. The primary database 401 comprises a multiway tree data structure (TRIE), as will be described below, wherein the network address is used to locate a pointer to an entry in the secondary database 402. The entry in the secondary database 402 includes the network information for the response.

As described above the address recognition engine 96A maintains the table 94A as a look-up table for database specifiers used in the control of a look-up operation in the look-up database 94, as will be described below. The index field 403B in the request input to the address recognition engine 96A provides an index to the table 94A to locate a look-up database specifier that is to be used in a current response look-up. Each processor 90A, 90B, at the time of extracting a network address from a data packet for a request, also utilizes the protocol type information in the header of the data packet to select an identifier for a database specifier from the table 93A, 93B. The processor 90A, 90B places the identifier for the database specifier in the index field 403B of the respective request 403.

The address recognition engine 96A reads the address 403A from the request and processes the address 403A in groups of four bits. Each group of four bits is referred to as a digit 404. The primary database 401 comprises a plurality of nodes 405 linked to one another by node pointers 407 with each node 405 being associated with a particular value for a digit or sequence of digits of a network address. Generally, each node 405 comprises 16 node pointer entries 406, one for each unique bit combination value of a four bit digit 404 that follows in sequence the digit or sequence of digits associated with the respective node 405 ($2^4$ equals 16, 0000 to 1111), as shown in FIG. 10.

The address recognition engine 96A will first access the primary database 401 using a root pointer address 408 that points to the root node 405A of the primary database 401. The root pointer address is identified in the database specifier being used by the address recognition engine 96A, as will appear. The root node 405A includes 16 node pointers 407, each including, for example, the address of one of the nodes associated with digits having the four highest order network address bits equal to 0000 to 1111, respectively. The address recognition engine 96A will utilize the node pointer 407 associated with the value of the bits of the first digit 404 that matches the value of the first digit of the network address being processed, for example bits of the first digit equal to 0000, to access the next node.

Figure 10:
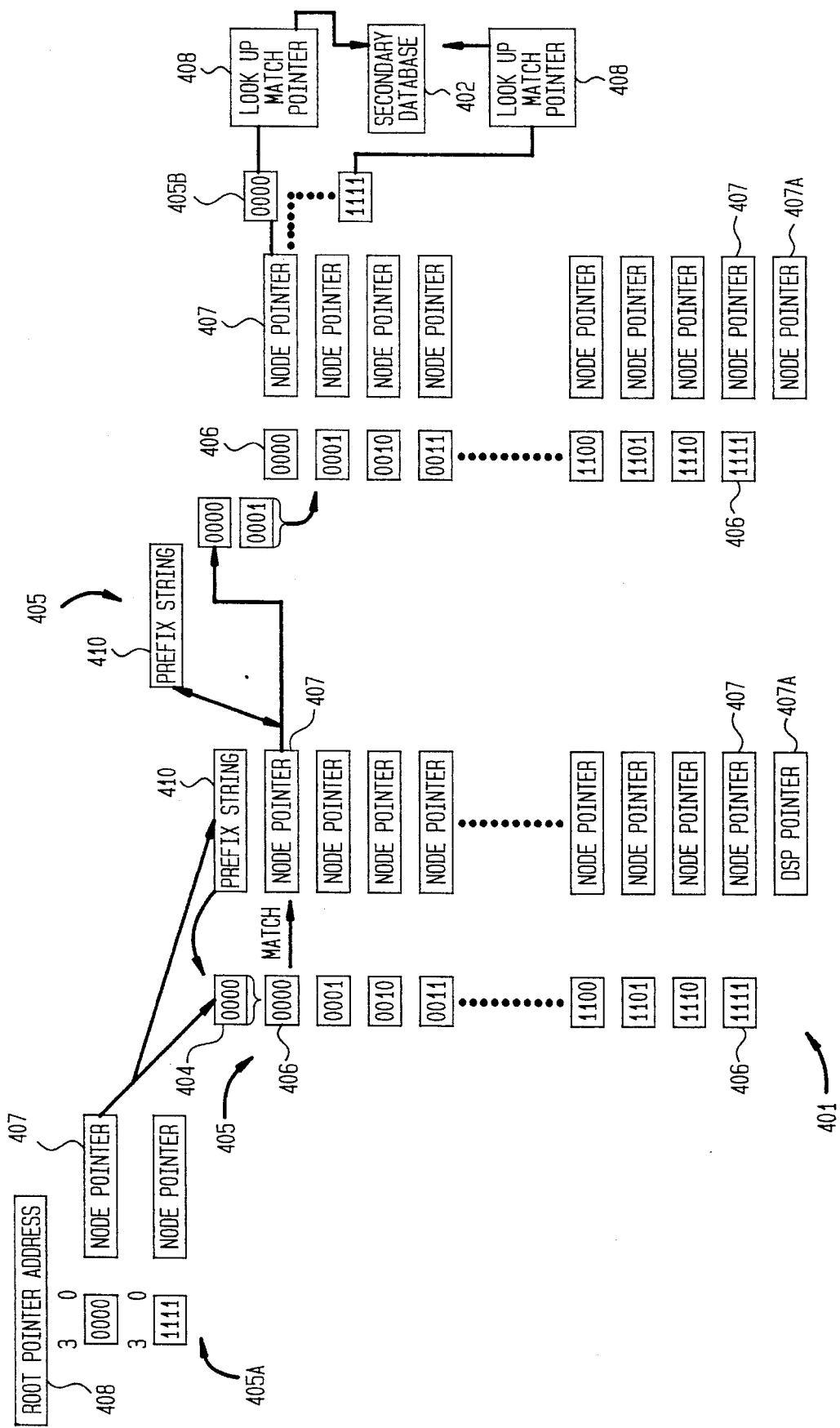
FIG. 10 is a schematic representation of the primary database of FIG. 8.

In the example of FIG. 10, the node 405 associated with the digit 404 including bits 0–3 equal to 0000 has 16 node pointers 407, including a node pointer 407 that is an address to a further node 405 associated with one of the values of the combination of bits for the next digit 404 of the network address, wherein the bits of the next digit equal 0000 and so on.

The primary database 401 is constructed in this manner so that each possible value for a digit 404 (e.g. the digit comprising bits 0–3) is linked to every possible digit value in the sequence of digits 404 that can comprise a network address (e.g. the digits comprising bits 4–7, 8–11 and 12–15) through the 16 node pointers 407 in each node 405. The address recognition engine 96A will traverse the primary database 401 from node to node via the node pointers 407 for the digit values that match the corresponding digit values of the network address being processed until all of the digits have been matched.

Each node 405 that points to a next node 405 in the sequence of digits of the network address is called a transition node (i.e. a node that points to another node). The nodes associated with the digits comprising the lowest four order bits of a network address are called termination nodes 405B since a match with the bits of the last digit completes the match process for the 16 bit network address of this example. Each termination node 405B comprises 16 look-up match pointers 409, one for each of the 16 possible values for the digit 404 comprising bits 12–15. Each look-up match pointer 409 comprises an address to an entry in the secondary database 402.

In view of the sparsely populated address spaces frequently encountered in networks, the nodes 405 are provided with prefix strings 410 to reduce the amount of memory space required for the primary database 401 and to decrease the search time. A sparsely populated space means that only a relatively few of the total number of bit values that can be represented by an n bit network address actually form an address for a component in the network. A prefix string is a string of digits that is common to many addresses. As should be understood, there may be a large number of common digits in a sparsely populated address space.

For example, a 16 bit network address can uniquely identify over 65,000 network components. However, the network utilizing the 16 bit address may only have 16 components, each of which can be uniquely identified by one of the 16 possible values of the lowest order digit of the address. This is an example of a sparsely populated address space and the values of the three higher order digits for all of the 16 components may be the same.

Thus, in this example, a prefix string can comprise a string of the three higher order digits used for a comparison to the three higher order digits of a network address being processed in a single node 405. The use of prefix strings will minimize the total memory space required to implement the primary database 401 since fewer total nodes 405 will be required to search a particular network address. The address recognition engine 96A will compare three digits of an address in the node 405 associated with the prefix string. An OSI network protocol address is 20 bytes long for a total of 40 digits. Certain high order digits, for example the 16 highest order digits of many addresses in the network, may be the same for many components in a particular OSI network and these digit values can be stored as prefix strings in associated nodes of the primary database for a single node comparison by the address recognition engine 96A.

Figure 11:
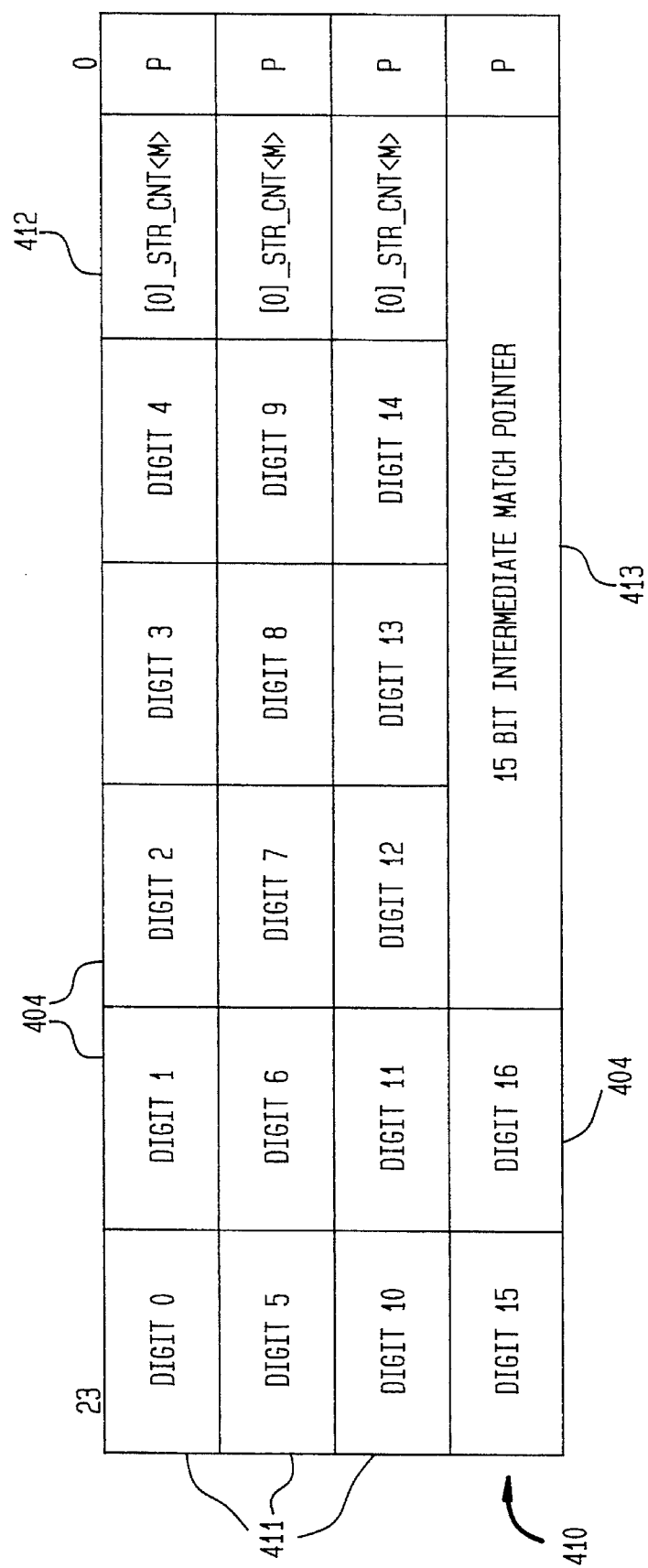
FIG. 11 illustrates an exemplary structure for a prefix string for a node of the primary database of FIG. 10.

FIG. 11 illustrates an exemplary data structure that can be used as a prefix string 410 in a node 405. The prefix string 410 is divided into four words 411. The first three words 411 each comprise five digits 404 and three control bits designated as DIG_STR_CNT 412 in bits 0–of the word. The control bits indicate which digits of the word are valid for comparison purposes, as will appear. The fourth word comprises two digits and an intermediate match pointer 413.

The control bits DIG_STR_CNT 412 are used to make the prefix string 410 flexible so that the prefix string 410 can represent a string of from one to 17 digits, according to the address space population of the protocol used in a particular network. The DIG_STR_CNT bits 412 for a word 411 are interpreted by the address recognition engine 96A, as follows:

DIG_STR_CNT bits 412 equal 000: all five digits are valid and further digits in the next word 411 are also valid (the control for valid digits in the next word are contained in the DIG_STR_CNT bits, 412 for the next word);

DIG_STR_CNT bits 412 equal 001–101: this is the last word of the string and the value of the DIG_STR_CNT bits indicates the number of valid digits in this word;

DIG_STR_CNT bits 412 equal 110: all five digits are valid and the first digit of the next word is valid and the first digit of the next word is the last digit of the string;

DIG_STR_CNT bits 412 equal 111: all five digits are valid and the first two digits of the next word are valid and the first two digits of the next word are the last digits of the string.

The DIG_STR_CNT bits 412 are set and the digits of a string are loaded into the prefix string structure 410 of a node 405 to form a string of digits that the address recognition engine 96A can compare with the corresponding digits of the network address being processed. The digit in the address after the string is used as an index into node pointers for continuation of the traversal of the primary database 401. For maximum flexibility, each node 405 of the primary database 401 is provided with a prefix string data structure 410 which is either used or not used depending on the address scheme used in a network. The intermediate match pointer 413 is used to locate an entry in the secondary database 402 for a best match location when an exact match cannot be found, as will be described below.

Each node pointer 407 includes a next node address and control fields to control the traversal of the primary database 401 by the address recognition engine 96A. An example of a node pointer 407 is shown in FIG. 12. An IDI_CNT field 414 comprises five bits, a LOAD_IDI field 415 comprises one bit, a SAVE_RESULT field 416 comprises one bit, a NEXT_NODE field 417 comprises 15 bits and a PTR_CTRL field 418 comprises two bits.

The NEXT_NODE field 417 contains the address for the next node 405 in the digit match traversal of the primary database 401.

The SAVE_RESULT field 416 is used in best match routing. In certain routing protocols, it is necessary to find the best match for a network address when an exact match cannot be found via the nodes 405 of the primary database 401. The SAVE_RESULT bit 416 is set in a node pointer 407 when a best match for an address is valid at the digit 404 of the address associated with the node 405 pointed to by the node pointer 407. When the SAVE_RESULT bit 416 is set, the address recognition engine 96A saves the value of the NEXT_NODE field 417 in an internal register. The stored NEXT_NODE value is an address to a next node 405 whose intermediate match pointer 413 is used as a pointer to the secondary database 402 should a best match be necessary (i.e. upon continuation of the traversal of the primary database 401, when no exact match is found for the address being processed, the address recognition engine 96A uses the stored NEXT_NODE value to access the intermediate match pointer for access to the secondary database 402).

In addition, certain network addresses are divided into segments according to, e.g., the IS—IS routing protocol. The International Organization for Standardization (ISO), for example, defines a hierarchial address structure comprising an initial domain part (IDP) and a domain specific part (DSP). The transition from the IDP portion to the DSP portion of an ISO formatted address does not follow the tree structure of the primary database 401.

Accordingly, the IDI_CNT field 414 and the LOAD_IDI field 415 are used to redirect a traversal of the primary database 401 at the digit of an ISO address where the IDP portion ends. When the bit of the LOAD_IDI field 415 is set in a node 405, the IDI_CNT field 414 will contain the number of digits from the current digit to the digit at the end of the IDP portion of the address. The address recognition engine 96A will store the value in the IDI_CNT field 414 (IDI count) and decrement the IDI count value for each subsequent node 405 until the value equals zero. At the node where the IDI count equals zero, the address recognition engine 96A will move to a next node 405 using an address stored in a DSP pointer 407A provided at the node 405 (see FIG. 10). The DSP pointer 407A points to a node that continues the traversal for an ISO address.

When the bit of the LOAD_IDI field 415 is not set, and a preselected one of the bits in the IDI_CNT field 414 is set, this will be interpreted as an Area Match (AM) bit set. Certain protocols, e.g. the DECnet/OSI and DECnet/Phase IV protocols, define an area address. When the AM bit is set on a node 405, this indicates that the end of an area address is valid at this digit. The continuation of the traversal of the primary database 401 after encountering a node 408 having a set AM bit will be described below.

The bits of the PTR_CTRL field 418 provides the address recognition engine 96A with information on the next node 405 pointed to by the NEXT_NODE field 417. The bits of the PTR_CTRL field 418 are interpreted, as follows:

PTR_CTRL bits equal 00: the next node does not contain a prefix string; as described above, each node is provided with a prefix string structure, when the PTR_CTRL bits are 00, the prefix string structure of the next node is not used and the 00 bits tell the address recognition engine 96A to ignore the structure in the next node;

PTR_CTRL bits equal 01: the next node contains a prefix string, accordingly, the address recognition engine 96A will compare the corresponding digits of the address being processed to the valid digits of the string, as indicated by the DIG_STR_CNT bits 412 of the prefix string 410;

PTR_CTRL bits equal 10: the next node is a "padding" entry, this tells the address recognition engine 96A to reuse the current node 405 because padding digits exist in the address, the padding digits are stripped from the address and the traversal continues[1], the NEXT NODE field 417 is ignored;

[1]The IDI field of the IDP portion of an OSI standard address is right justified and padded to fill the fixed length of the field. The padding digits are looped back to the current node 305 using the padding pointers.

PTR_CTRL bits equal 11: the pointer indicates a look-up-fail, the pointer indicates that the intermediate match pointer saved from the node where the SAVE_RESULT bit was set should now be used to access the secondary database, the NEXT_NODE field 417 is ignored.

When a termination node 405B is reached, the address recognition engine 96A will access the secondary database 402 with the appropriate look-up match pointer 409. The address recognition engine 96A will retrieve information from a corresponding secondary database entry according to control bits of the look-up database specifier indicated by the look-up type field 403B of the respective request, as will appear. If the PTR_CTRL bits of the node pointer 405 to the termination node 405B indicate that the termination node contains a string, then the address recognition engine 96A must compare the remaining digits of an address being processed with the string. If a match occurs, the corresponding look-up match pointer 409 of the termination node 405 is used to access the secondary database 402. If there is no match or if there are less digits remaining in the address than in the string, then the intermediate match pointer saved from the node 405 where the SAVE_RESULT bit was set is used to access the secondary database 402.

Figure 13A:
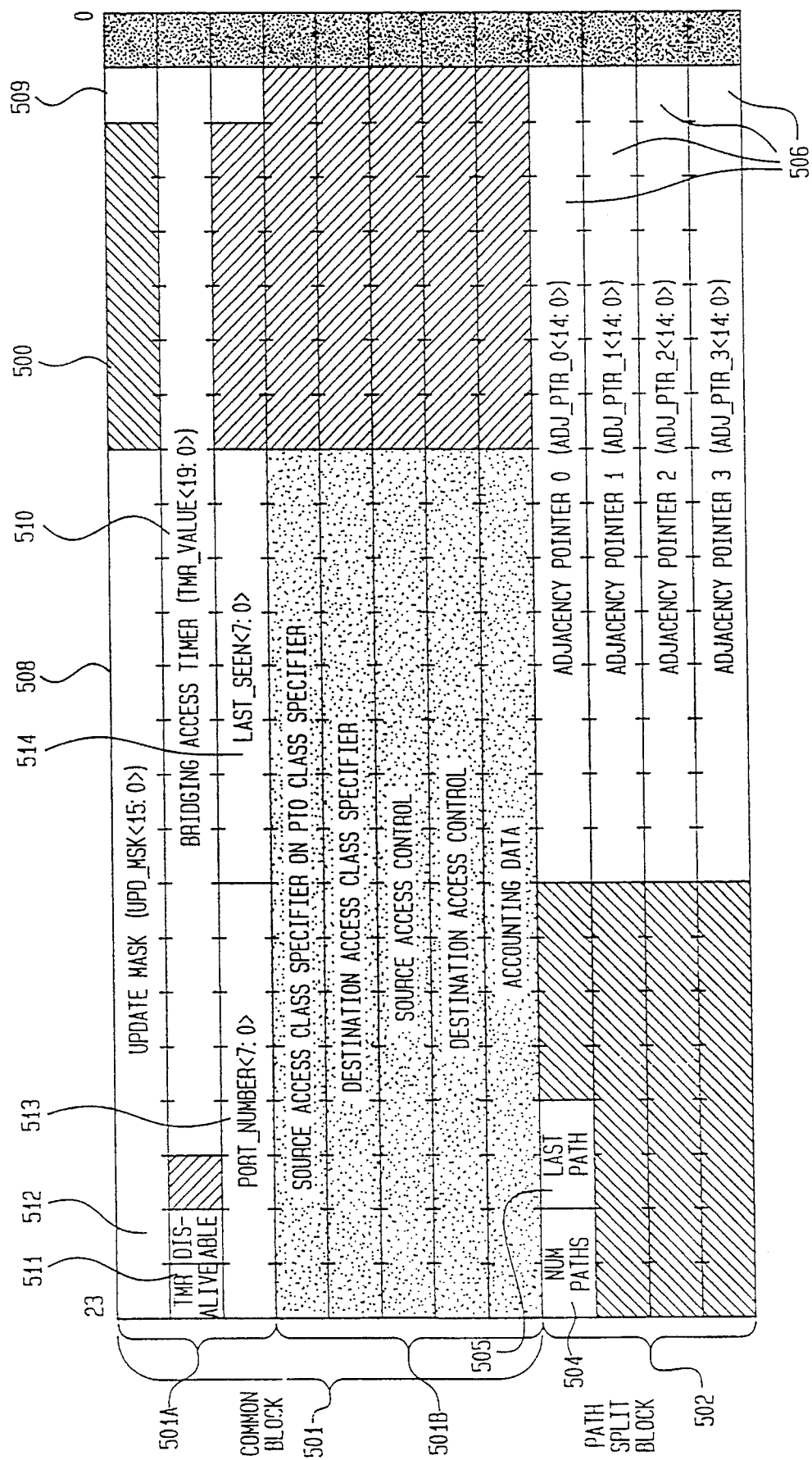
FIG. 13 illustrates an exemplary format for an entry in the secondary database of FIG. 9.
Figure 13B:
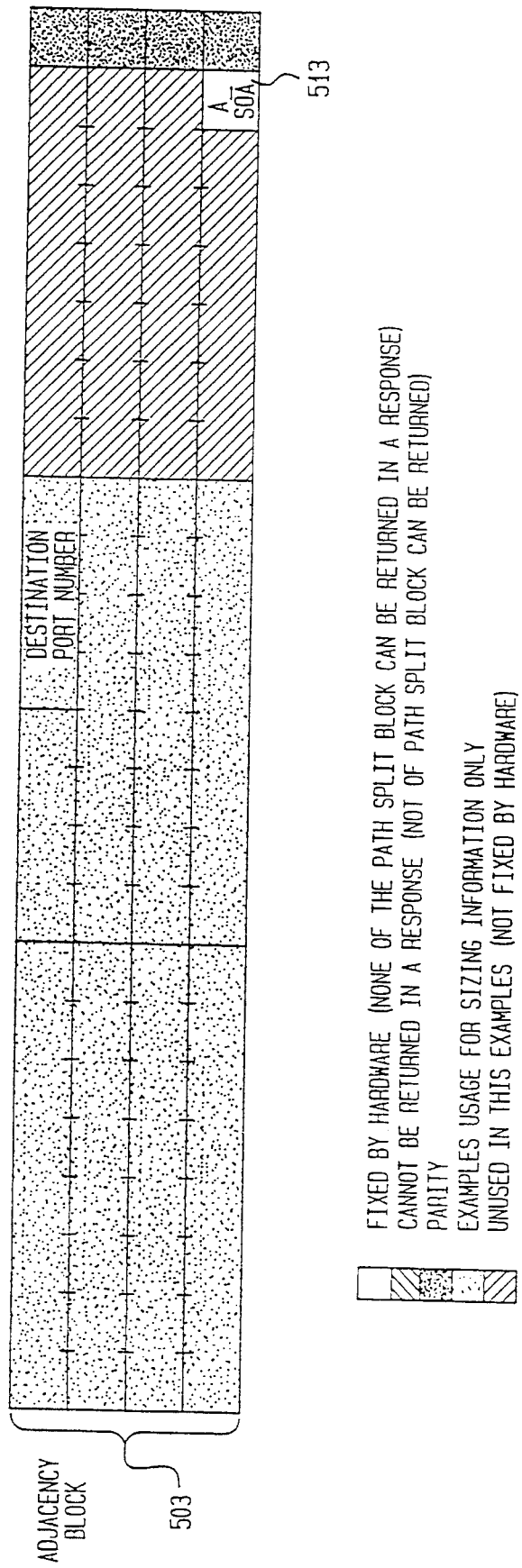

Referring now to FIG. 13, there is illustrated an exemplary format for a secondary database entry 500. There are three types of secondary database entries 500: a common block 501, a path split block 502 and an adjacency block 503. Each common block 501 is linked to a path split block 502. There are an equal number of common, path split and adjacency blocks 501, 502, 503 in the secondary database 402. There is no direct relationship between each linked common block/path split block and the adjacency blocks. Each of the common and adjacency blocks 501, 502 contains information to be returned by the address recognition engine 96A as a response to the request/response RAM 96B.

Each common block 501 is eight words long. The first three words 501A are used to maintain ageing and learning information required when the destination of a data packet is reached using a bridge, as will be described below. The remaining five words 501B are uncommitted and are used to store any information that may be required for return in a response, as for example routing information for OSI or DECnet network protocols, etc. Each of the look-up match 409 and intermediate look-up 413 pointers of the primary database 401 index a corresponding common block 501.

Each path split block 502 is linked to a respective common block 501 and comprises a group of four pointers used to select an adjacency block 503 for use in a current response.

Each adjacency block 503 is four words long. The words of each adjacency block 503 also contain information that may be required in a response. Successive look-up's to the same common block 501 of the secondary database 402 may each return information from a different adjacency block 503 depending upon the path splitting operation.

Each path split block 502 includes a NUM_PATHS field 504 comprising two bits, a LAST_PATH field 505 comprising two bits and four adjacency block pointers 506, each comprising 15 bits designated ADJ_PTR_0 to ADJ_PTR_3, respectively. Each adjacency block pointer 506 points to a respective adjacency block 503. The bits of the NUM_PATHS field 504 are interpreted by the address recognition engine 96A, as follows:

NUM_PATHS bits equal 00: one adjacency block only is accessed through the path split block 502, as indicated by ADJ_PTR_0;

NUM_PATHS bits equal 01: one of two different adjacency blocks is accessed through the path split block 502, as indicated by either ADJ_PTR_0 or ADJ_PTR_1;

NUM_PATHS bits equal 10: one of three different adjacency blocks is accessed through the path split block 502, as indicated by one of ADJ_PTR_0 to ADJ_PTR_2;

NUM_PATHS bits equal 11: one of four different adjacency blocks is accessed through the path split block 502, as indicated by one of ADJ_PTR_0 to ADJ_PTR_3.

The LAST_PATH field 505 indicates the number of the adjacency block pointer 506 to use during a current retrieval of information from the secondary database 402 for a response. The bits of the LAST_PATH field 505 are interpreted by the address recognition engine 96A, as follows:

LAST_PATH bits equal 00: utilize ADJ_PTR_0 for the current response;

LAST_PATH bits equal 01: utilize ADJ_PTR_1 for the current response;

LAST_PATH bits equal 10: utilize ADJ_PTR_2 for the current response;

LAST_PATH bits equal 11: utilize ADJ_PTR_3 for the current response.

Each time the address recognition engine 96A enters a path split block 502, it increments the LAST_PATH field 505. If the value of the bits in the LAST_PATH field 505 exceeds the value of the bits in the NUM_PATHS field 504 of the path split block 502, then the LAST_PATH field 505 is set to zero. Thus, the value of the bits in the LAST_PATH field 505 cycles from 0 to the value of the bits in the NUM_PATHS field 504 of the path split block 502.

The path splitting operation provided by the path splitting block 502 provides automatic control of routing information changes that may be desired in a particular routing protocol on successive transmissions of data packets to a particular network address. The NUM_PATHS and LAST_PATH fields 504, 505 can be utilized to set a number of different adjacency blocks to be accessed on successive reads of a particular common block 501 and to control which adjacency block is read during a current common block read.

Figure 14:
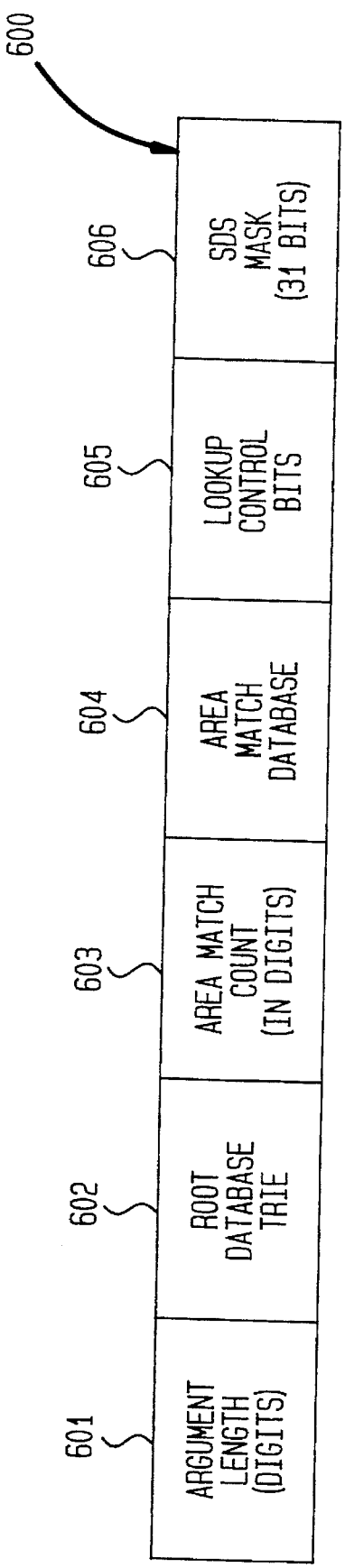
FIG. 14 illustrates an exemplary format for a look-up database specifier of the address recognition engine of FIG. 1.

Referring now to FIG. 14, there is shown an exemplary format for a look-up database specifier 600. As discussed above, the address recognition engine 96A maintains a table 94A of look-up database specifiers 600, e.g. 24 look-up database specifiers 600. In processing a specific request, the address recognition engine 96A proceeds to traverse the primary database 401 and retrieve information from the secondary database 402 according to control bits set in a particular look-up database specifier 600 indicated by the processor 90A, 90B in the look-up type field 403B of the request 403 (see FIG. 8).

As described above, the processor 90A, 90B analyzes the protocol type information contained in the header of a data packet and uses that information to select an appropriate identifier for a corresponding database specifier from its table 93A, 93B. The processor 90A, 90B then writes the selected identifier into the index field 403B of a request 403. This scheme provides an interlock between the processor 90A, 90B and the address recognition engine 96A that affords maximum flexibility in the structure of the database 94.

For example, the multiple root node arrangement for the primary database 401 permits maximum flexibility to accommodate the various address lengths and formats of different network protocols. The appropriate root node index for each protocol can be specified in a corresponding database specifier. The processor 90A, 90B can readily correlate the protocol type information transmitted in each header through the cross reference table 93A, 93B.

Moreover, different protocols require different address formats and other items, such as protocol class, that may be stored in the common block 501 and related adjacency blocks 503 of the secondary database entry 500 pointed to in the processing of a particular request. The look-up database specifiers provide a mechanism for controlling what information is returned in a response.

Each look-up database specifier 600 comprises six fields: an argument length field (ARG_LENGTH) 601 comprising 6 bits, a root database TRIE field (ROOT_TRIE) 602 comprising five bits, an area match count field (AM_CNT) 603 comprising six bits, an area match root database TRIE field 604 (AM_TRIE) comprising five bits, a look-up control bits field 605 including a preselected number of look-up control bits, and a secondary database mask (SDB_MASK) 606 comprising 31 bits.

The argument length field 601 indicates the number of digits in the address portion 403A of a particular request 403 (see FIG. 8). As discussed above, the network addresses written as requests into the request/response RAM 96B can be fixed length or vary in length, depending upon the network protocol associated with each particular address.

The root database TRIE field 602 specifies which root transition node is to be used in the primary database 401. The primary database 401 can be implemented with a plurality of roots, each used to commence a search for a secondary database look-up match pointer 409. Thus, the number set in the ROOT_TRIE field 602 is used by the address recognition engine 96A to determine at which root the search should begin.

The area match count field 603 indicates the number of remaining digits beyond the digit indicated by a set AM bit to complete an area, as described above, for an area transition within the primary database 401. The area match root TRIE field 604 indicates the root node 405 of the primary database 401 to be used for the remaining area-match-count digits of the address.

If the AM bit is set in a node pointer 407 and the number of digits remaining in an address being processed equals the value in the area match count field 603 of the look-up database specifier 600 indicated in the request 403, then a transition is made to the root node specified by the area match root TRIE field 604 of that look-up database specifier 600. The next digit of the address being processed is used for matching in the specified root node. If the number of remaining digits is not equal to the area match count value or if the AM bit is not set in a node pointer 407, then the next digit is looked up in the node pointed to by NEXT_NODE field 417 of the node pointer 407.

The look-up control bits field 605 can include various bits used to control the operation of the address recognition engine 96A during a look-up operation. For example, a look-up disable bit can be provided to disable a look-up type specified by the associated look-up database specifier 600. When set, an error is returned if the associated look-up database specifier 600 is indicated in the look-up type field 403B of a request.

The address recognition engine of the present invention is adapted to support both routing and bridging protocols. As described above, each common block 501 includes three words 501A reserved for ageing and learning information necessary for the implementation of a bridging protocol. A port learning and ageing bit is included in the look-up control bits field 605 to indicate to the address recognition engine 96A that a particular network destination address requires a bridging operation to transfer the respective data packet. When the port learning and ageing bit is set in a look-up database specifier 600, the following learning and ageing functions are performed by the address recognition engine 96A.

The address recognition engine 96A reads the first word 501A of the common block 501 for an update mask 508 comprising 16 bits. Each bit of the update mask 508 corresponds to, e.g., one of the ports in the line card 74A, 74B that can be a source port in a bridge. For each port whose corresponding bit is set in the mask 508, a learning operation is performed. The processor 90A, 90B will include a bit number in each request to specify a particular bit in the mask 508 relating to a bridging address. The address recognition engine 96A will determine if the bit for the port number specified by the processor 90A, 90B in the request is set in the mask 508. If the specified bit is not set, learning is not performed by the address recognition engine 96A for that port. However, a timer override bit 508 is provided in the first word 501A. When each of the timer override and port learning and ageing bits are set, the address recognition engine 96A will perform the ageing function in respect of the common block 501.

Upon entry to the common block 501 for a bridging address, the address recognition engine 96A clears a bridging access timer 510 in the second word 501A to zero and sets a timer alive bit 511, also in the second word 501A. The timer field comprises 20 bits. As a background operation, the address recognition engine 96A polls each common block 501 having a set timer alive bit 511, e.g. once each second, and increments the value in the timer field 510.

The address recognition engine 96A maintains an ageing time-out value which is compared to the incremented value in the timer field 510. If the incremented value in the timer field 510 is larger than the ageing time-out value, then the timer alive bit 511 is cleared to indicate that the bridging information in the corresponding common block 501 has aged out, as understood by the bridging protocol.

The second word 501A also includes a timer disable bit 12. When the timer disable bit 512 is set, the timer field 510 is not incremented. The timer disable bit 512 is set in any common block 501 for which ageing is not to be performed. If both the timer disable bit 512 and timer alive bit 511 are set, this maintains the common block 501 as "permanently alive".

The third word 501A of the common block 501 includes a port number field 513 and a last seen field 514 used for source port learning. When the port learning and ageing bit is set and the learning operation is being performed (as indicated by the appropriate bit in the update mask 508), the address recognition engine 96A will write the source port number for a data packet into the port number field 513. The source port number is also written into the last seen field 514, whether or not the learning operation is being performed.

The look-up control bits field 605 can also include an enable adjacency set-on-access bit to indicate to the address recognition engine 96A that a set-on-access (A_SOA) bit 515 (provided in each adjacency block 503, see FIG. 13) be set when the address recognition engine 96A reads an adjacency block 503. The set-on-access bit 515 supports the address resolution protocol cache requirements of the IP network protocol. The cache requirements of the IP protocol can be implemented in the processor 90A, 90B of the line card 74A, 74B. A set A_SOA bit 515 indicates to the processor 90A, 90B that the respective adjacency block 503 has been used in a routing operation.

The secondary database mask (SDB_MASK) 606 of each look-up database specifier 600 is used to select which bytes of data stored in the five longwords 501B of a common block 501 and the four longwords of a related adjacency block 503 are to be returned to the processor 90A, 90B in a particular response.

The first 19 bits of the mask 606 determine which bytes of the common block 501 are returned. Each byte of the common blocks 501 corresponds to one of the 19 bits. If the corresponding bit of the mask 606 is set, the byte is returned in the response. Similarly, the next 12 bits are used to determine which bytes of the adjacency block 503 are returned in the response, as a function of which of the 12 bits are set. If all of the adjacency bits of the mask 606 are zero and the enable adjacency set-on-access bit of the look-up control bits field 605 is not set, then the path split adjacency block pointers 506 are not used and the LAST_PATH field 505 is not incremented.

The various control bits of the prefix string data structures 410, the node pointers 407, the path split blocks 502 and the look-up database specifiers 600 provide maximum flexibility in the control of the traversal of the primary database 401 and the retrieval of routing or bridging information from the secondary database 402. The control bit arrangement of the address recognition engine 96A builds in device compatibility to accommodate the varying requirements of dissimilar routing and bridging protocols in a single memory structure that can provide a centralized resource to several components performing bridging or routing operations in a computer network.

What is claimed is:

1. An address recognition apparatus for receiving a request from a line card, the address recognition apparatus comprising:

an address recognition engine adapted to receive as an input the request from the line card, the request comprising a network address and an identifier for a database specifier corresponding to the protocol type for a respective data transmission, each identifier containing database specifier index information;

a table of database specifiers coupled to the address recognition engine for receiving the identifier for use as an index to the table of database specifiers, the table of database specifiers including a plurality of data base specifiers, each database specifier including network address look-up control information, the table of database specifiers operating to supply to the address recognition engine the network address look-up control information contained in the database specifier indexed by the identifier;

a network address information look-up database coupled to the address recognition engine;

the network address information look-up database comprising a plurality of entries, each one of the entries containing network information relating to the network address used to locate the corresponding one of the entries;

the address recognition engine operating to use the network address contained in the request and the network address look-up control information supplied by the table of database specifiers as a look-up index to the lookup database for access to and retrieval of a corresponding one of the entries.

2. The address recognition apparatus of claim 1, wherein the entries in the network address information look-up database are arranged in a multiway tree node structure.

3. A line card, which comprises:

a line interface for coupling to a data transmission line to receive and transmit data communications, each data communication containing a network address and a protocol type identification;

a processor coupled to the line interface for processing each data communication according to a protocol type identified in the data transmission and as a function of network address information stored in an address recognition engine database;

a table of identifiers for database specifiers coupled to the processor, the table of identifiers including a plurality of identifiers, each identifier comprises an index to an address recognition engine specifier table having a plurality of entries, each entry containing a data base specifier corresponding to one of the identifiers contained in the table of identifiers, and each database specifier containing network address look-up control information for controlling access to the address recognition engine database, the processor generating requests for network information relating to the data transmissions received at the line card, each request containing a network address obtained from a respective data communication and the identifier corresponding to the protocol type for the respective data transmission, the identifier being obtained from the table of identifiers.

4. The line card of claim 3, wherein each identifier corresponds to a protocol type.

5. A computer system, which comprises:

a line card adapted to receive and transmit data transmissions to and from a data transmission line;

an address recognition engine including a network information lookup database;

the lookup database comprising a plurality of entries, each one of the plurality of entries containing network information, the network information relating to computer network addresses contained in the data transmissions;

a backplane bus coupling the line card and the address recognition engine to one another;

the line card including a first table of identifiers for database specifiers, each identifier relating to a protocol type identified in the data transmissions received at the line card;

the line card operating to transmit to the address recognition engine, via the backplane bus, requests for network information relating to the data transmissions received at the line card, the requests each containing a network address and an identifier for a database specifier corresponding to the protocol type for a respective data transmission;

the address recognition engine including a second table of database specifiers indexed by the identifiers;

the address recognition engine operating to use the identifier of each request to select a database specifier from the second table and to use the network address of the request as a lookup index to the lookup database for access to and retrieval of a corresponding one of the network information entries as a response to the line card;

wherein each database specifier contains control information for control of the address recognition engine during the access to and retrieval of the corresponding one of the entries;

the address recognition engine operating to affect the transmission of the response to the line card via the backplane bus for use by the line card.

6. The computer system of claim 5 wherein the network information lookup database comprises a primary database and a secondary database, the plurality of network information entries being arranged in the secondary database, the primary database comprising a plurality of linked nodes for matching to preselected portions of a network address contained in a request so that a network address input to the primary database traverses the linked nodes according to matches among linked nodes to locate a secondary database pointer to one of the entries of the secondary database, the address recognition engine using each network address as an input to the primary database and using the located secondary database pointer to access and retrieve the corresponding one of the network information entries from the secondary database under the control of the control information contained in the selected database specifier.

7. The computer system of claim 6, wherein the line card receives and transmits data transmissions, each data transmission including a plurality of data packets, each one of the data packets including network address information and protocol type information, the network address information including an n-bit field of the respective one of the data packets, each network address of a request comprising one of the n-bit fields containing network address information; and wherein the address recognition engine segments each n-bit request into a plurality of m-bit digits for traversal through the primary database, each m-bit digit having one of $2^m$ distinct values, wherein m and n are integers and m is less than n.

8. The computer system of claim 5 wherein the control information of each one of the database specifiers includes an information mask to indicate to the address recognition engine preselected portions of the network information contained in the respective one of the entries, for use in the response.

9. The computer system of claim 5 wherein each one of the entries comprises a bridging information field; and wherein the control information of each one of the database specifiers includes a port learning and ageing field, the port learning and ageing field being in one of a set state and a clear state, and wherein the address recognition engine is controlled to perform a bridging operation to read and write bridging information from and to the bridging information field when the port learning and ageing field of a selected database specifier is in the set state.

10. The computer system of claim 5 further comprising a request/response memory coupled to the address recognition engine for storage of requests from the line card and corresponding responses from the lookup database.

11. The computer system of claim 10 wherein the request/response memory comprises a plurality of entries, each of the entries including a request storage memory space for storing a request and a response storage memory space for storing a corresponding response.

12. The computer system of claim 11, wherein the request storage memory space of each one of the entries includes a first preselected space for storage of ownership information and the response storage memory space of each one of the entries includes a second preselected space for storage of ownership information; the ownership information of the first preselected space indicating whether a request stored in the respective request storage memory space is valid for use by the address recognition engine and the ownership information of the second preselected space indicating whether a response stored in the respective response memory space is valid for use by the line card.

13. The computer system of claim 10 wherein the request/response memory comprises a RAM.

14. A computer system, which comprises:

a line card adapted to receive and transmit data transmissions to and from a data transmission line;

an address recognition engine including a network information lookup database;

the lookup database comprising a plurality of entries, each one of the plurality of entries containing network information, the network information relating to computer network addresses contained in the data transmissions;

a backplane bus coupling the line card and the address recognition engine to one another;

the line card including a first table of identifiers for database specifiers, each identifier relating to a protocol type identified in the data transmissions received at the line card;

the line card operating to transmit to the address recognition engine, via the backplane bus, requests for network information relating to the data transmissions received at the line card, the requests each containing a network address and an identifier for a database specifier corresponding to the protocol type for a respective data transmission;

the address recognition engine including a second table of database specifiers indexed by the identifiers; the address recognition engine operating to use the identifier of each request to select a database specifier from the second table and to use the network address of the request as a lookup index to the lookup database for access to and retrieval of a corresponding one of the network information entries as a response to the line card;

wherein each database specifier contains control information for control of the address recognition engine during the access to and retrieval of the corresponding one of the entries;

the address recognition engine operating to affect the transmission of the response to the line card via the backplane bus for use by the line card;

wherein the network information lookup database comprises a primary database and a secondary database, the plurality of network information entries being arranged in the secondary database, the primary database comprising a plurality of linked nodes for matching to preselected portions of a network address contained in a request so that a network address input to the primary database traverses the linked nodes according to matches among linked nodes to locate a secondary database pointer to one of the entries of the secondary database, the address recognition engine using each network address as an input to the primary database and using the located secondary database pointer to access and retrieve the corresponding one of the network information entries from the secondary database under the control of the control information contained in the selected database specifier;

wherein the line card receives and transmits data transmissions, each data transmission including a plurality of data packets, each one of the data packets including network address information and protocol type information, the network address information including an n-bit field of the respective one of the data packets, each network address of a request comprising one of the n-bit fields containing network address information; and wherein the address recognition engine segments each n-bit request into a plurality of m-bit digits for traversal through the primary database, each m-bit digit having one of $2^m$ distinct values, wherein m and n are integers and m is less than n;

wherein the plurality of linked nodes includes at least one set of transition nodes and a set of termination nodes linked to each one of the at least one set of transition nodes, each of the at least one set of transition nodes being linked to a root node and each of the at least one root node and each node of the at least one set of transition nodes includes 2m node pointers for linking to subsequent nodes, each one of the node pointers of one of the root and transition nodes corresponds to one of the 2m distinct values and points to a subsequent one of one of the at least one set of transition nodes and the linked set of termination nodes, each one of the termination nodes includes 2m secondary database pointers, each one of the secondary database pointers of one of the termination nodes corresponds to one of the 2m distinct values and points to one of the network information entries of the secondary database, the digits of each request being matched, one at a time, in a preselected sequence of digits, to a corresponding sequence of linked node pointers of a root node and subsequent transition nodes to traverse the primary database to one of the termination nodes.

15. The computer system of claim 14 wherein the control information of each one of the database specifiers includes root node information to indicate to the address recognition engine which root node to commence a traversal of the primary database.

16. The computer system of claim 14 wherein the control information of each one of the database specifiers includes an area match information field, the area match information field representing a set state and a clear state, the set state indicating to the address recognition engine that the traversal of the primary database is to be redirected at a preselected one of the digits of a network address and the clear state indicating to the address recognition engine that the traversal of the primary database is to continue without redirection.

17. The computer system of claim 16, wherein the control information of each one of the database specifiers includes an area match count field and an area match root field, each area match count field indicates to the address recognition engine the preselected one of the digits of a request at which a redirection of traversal of the primary database is to occur when area match information at any one digit of the network address is in the set state and each area match root field indicates to the address recognition engine a preselected node of the primary database where the traversal of the primary database is to continue for remaining subsequent digits of the request.

18. A computer system, which comprises:

a line card adapted to receive and transmit data transmissions to and from a data transmission line;

an address recognition engine including a network information lookup database;

the lookup database comprising a plurality of entries, each one of the plurality of entries containing network information, the network information relating to computer network addresses contained in the data transmissions;

a backplane bus coupling the line card and the address recognition engine to one another;

the line card including a first table of identifiers for database specifiers, each identifier relating to a protocol type identified in the data transmissions received at the line card;

the line card operating to transmit to the address recognition engine, via the backplane bus, requests for network information relating to the data transmissions received at the line card, the requests each containing a network address and an identifier for a database specifier corresponding to the protocol type for a respective data transmission;

the address recognition engine including a second table of database specifiers indexed by the identifiers; the address recognition engine operating to use the identifier of each request to select a database specifier from the second table and to use the network address of the request as a lookup index to the lookup database for access to and retrieval of a corresponding one of the network information entries as a response to the line card;

wherein each database specifier contains control information for control of the address recognition engine during the access to and retrieval of the corresponding one of the entries;

the address recognition engine operating to affect the transmission of the response to the line card via the backplane bus for use by the line card;

request/response memory coupled to the address recognition engine for storage of requests from the line card and corresponding responses from the lookup database;

wherein the request/response memory comprises a plurality of entries, each of the entries including a request storage memory space for storing a request and a response storage memory space for storing a corresponding response;

wherein the request storage memory space of each one of the entries includes a first preselected space for storage of ownership information and the response storage memory space of each one of the entries includes a second preselected space for storage of ownership information; the ownership information of the first preselected space indicating whether a request stored in the respective request storage memory space is valid for use by the address recognition engine and the ownership information of the second preselected space indicating whether a response stored in the respective response memory space is valid for use by the line card;

wherein the line card operates to transmit each request by writing each request in the request storage memory space of a preselected one of the entries and simultaneously writing ownership information in the respective first preselected space to indicate that the corresponding request is valid.

19. The computer system of claim 18 wherein the address recognition engine polls and reads each request storage memory space and uses each valid request to access the network information lookup database for a corresponding response, the address recognition engine writing ownership information in the respective first preselected space upon reading a request, to indicate that the corresponding request is now not valid, and storing each response in the response storage memory space of the preselected one of the entries storing the respective request and writing ownership information in the respective second preselected space to indicate that the corresponding response is valid.

20. The computer system of claim 19 wherein each first preselected space stores ownership information comprising OWN_ID information and REQ_ID information;

the OWN_ID information representing one of a set state and a clear state, the set state indicating to the address recognition engine that a request stored in the respective request memory space is valid for use by the address recognition engine and the clear state indicating to the address recognition engine that a request stored in the respective request memory space is not valid for use by the address recognition engine;

the REQ_ID information representing one of a set state and a clear state, the state of the REQ_ID information being used by the address recognition engine to determine ownership information for writing in the second preselected space.

21. The computer system of claim 20, wherein the line card writes ownership information in a respective first preselected space by setting the OWN_ID information and writing REQ_ID information in a state that is opposite to the state of the REQ_ID information prior to the writing of ownership information by the line card.

22. The computer system of claim 21, wherein each second preselected space stores ownership information comprising RSP_ID information; the RSP_ID information representing one of a set state and a clear state, the state of the RSP_ID information written by the address recognition engine upon storing a response, being a state that matches the state of the REQ_ID information when the address recognition engine polls and reads the respective valid request.

23. The computer system of claim 22 wherein the line card reads the response memory storage space of each one of the preselected entries containing a request written by the line card, the response being valid for use by the line card when the state of the RSP_ID information in the second preselected space of the respective response memory space matches the state of the REQ_ID information written by the line card upon writing the corresponding request.

* * * * *